United States Patent [19]
Bobbio et al.

[11] Patent Number: 5,479,061
[45] Date of Patent: Dec. 26, 1995

[54] PLEATED SHEET MICROELECTROMECHANICAL TRANSDUCER

[75] Inventors: Stephen M. Bobbio, Wake Forest; Thomas D. DuBois, Charlotte; Bruce W. Dudley, Durham; Susan K. Jones, Raleigh; Mark D. Kellam, Chapel Hill; Farid M. Tranjan, Charlotte, all of N.C.

[73] Assignees: University of North Carolina, Charlotte; MCNC, Research Triangle Park, both of N.C.

[21] Appl. No.: 999,161

[22] Filed: Dec. 31, 1992

[51] Int. Cl.⁶ .................................................. H02N 1/00
[52] U.S. Cl. ............................................ 310/309; 200/1 R
[58] Field of Search ........................... 310/309, 40 MM; 200/1 R, 5 A; 381/191

[56] References Cited

U.S. PATENT DOCUMENTS

| | | |
|---|---|---|
| 2,975,307 | 3/1961 | Schroeder et al. . |
| 3,008,014 | 11/1961 | Williamson et al. . |
| 3,153,229 | 10/1964 | Roberts . |
| 3,315,103 | 4/1967 | Duff et al. . |
| 3,345,469 | 10/1967 | Rod . |
| 3,389,226 | 6/1968 | Peabody . |
| 3,544,733 | 12/1970 | Reylek .................................. 381/191 |
| 4,034,332 | 7/1977 | Alais . |
| 4,042,438 | 8/1977 | Kawakami et al. . |
| 4,160,882 | 7/1979 | Driver . |
| 4,206,369 | 6/1980 | Lewiner et al. . |
| 4,207,442 | 6/1980 | Freeman . |
| 4,342,935 | 8/1982 | Kallmeyer et al. . |
| 4,384,230 | 5/1983 | Wisner . |
| 4,429,190 | 1/1984 | Stockbridge . |
| 4,510,412 | 4/1985 | Suda et al. . |
| 4,615,591 | 10/1986 | Smith et al. . |
| 4,678,955 | 7/1987 | Toda . |
| 4,721,447 | 1/1988 | Erckmann . |
| 4,789,803 | 12/1988 | Jacobsen et al. . |
| 4,814,657 | 3/1989 | Yano et al. . |
| 4,841,191 | 6/1989 | Takata et al. . |
| 4,863,252 | 9/1989 | McCarthy et al. . |
| 4,887,248 | 12/1989 | Griebeler . |
| 4,897,592 | 1/1990 | Hyde . |
| 5,001,381 | 3/1991 | Watanabe . |
| 5,113,566 | 5/1992 | Weekamp et al. . |
| 5,206,557 | 4/1993 | Bobbio .................................. 310/309 |

OTHER PUBLICATIONS

PCT International Search Report dated Mar. 23, 1992 of International Appln. No. PCT/US91/08901 filed Nov. 25, 1991.

*Silicon Micromechanics: Sensors and Actuators on a Chip*, SPECTRUM, Jul. 1990, Howe, R. T. et al., University of California at Berkeley; Gabriel, K. J. et al., AT&T Bell Laboratories.

*Silane Coupling Agent Chemistry*, Arkles, Silicon Compounds Register and Review, 1987, Petrarch Systems, pp. 54–59.

*Parylene Conformal Coatings Specifications and Properties*, Specialty Coating Systems, Inc. 1992, Union Carbide.

*Primary Examiner*—R. Skudy
*Attorney, Agent, or Firm*—Bell, Seltzer, Park & Gibson

[57] ABSTRACT

An electrically and mechanically robust microelectromechanical transducer is formed of a pleated dielectric sheet having patterned electrical conductors on the opposing faces thereof. The pleats define a plurality of spaced apart walls, with each wall including an electrically conductive portion at one side thereof. Positive and negative voltages, applied to opposite faces of the pleated sheet, cause the walls to move towards one another by electrostatic attraction. The walls can also move away from one another by electrostatic repulsion upon application of appropriate voltages. The microelectromechanical transducer may be fabricated by fabricating a sheet with integral pleats or by forming a "self-pleating" flat sheet which forms pleats after conductor fabrication thereon.

28 Claims, 16 Drawing Sheets

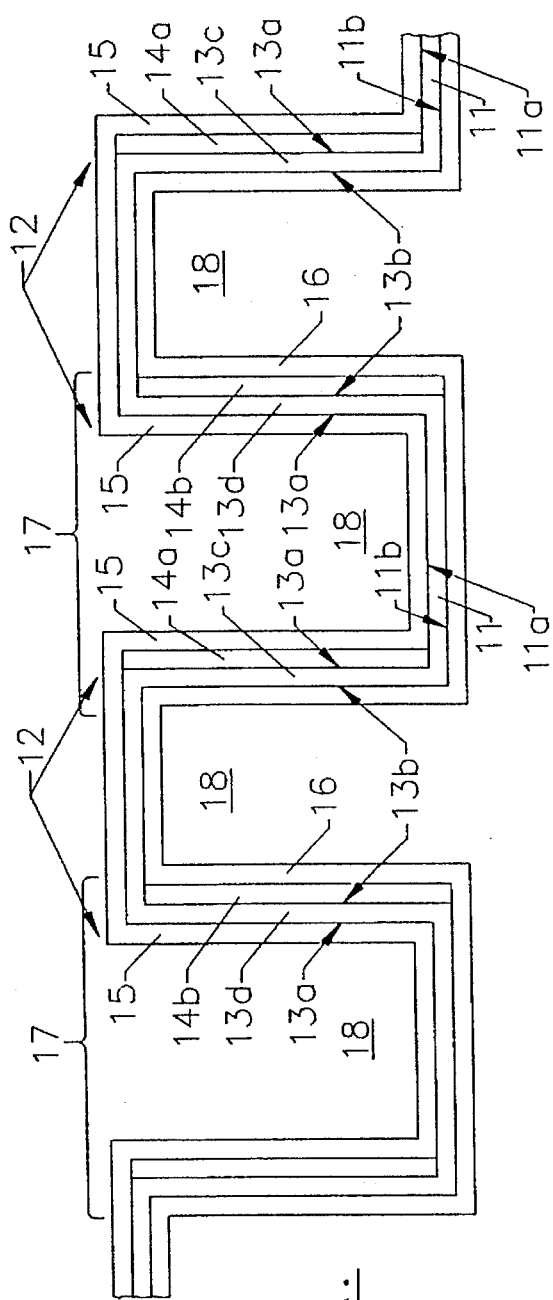
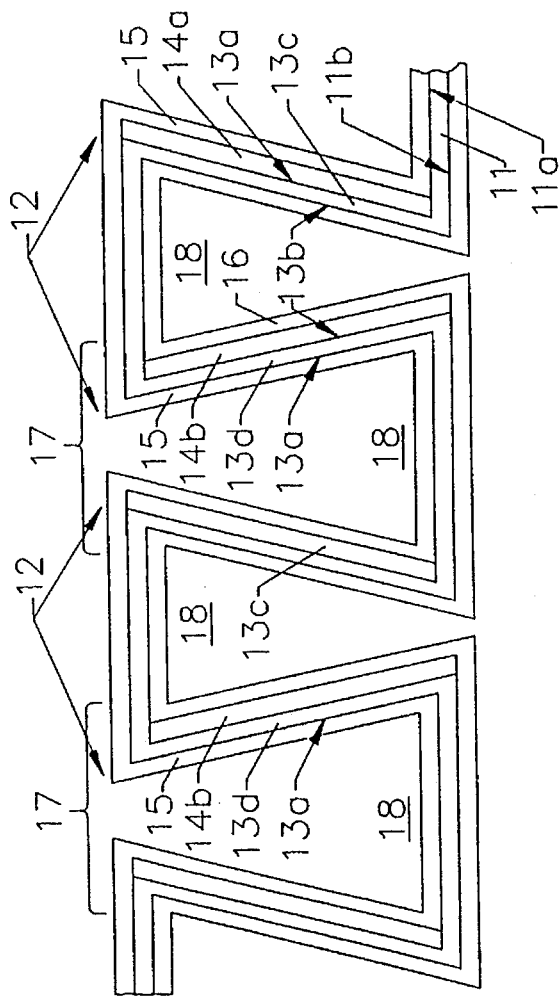
FIG. 2A.
FIG. 2B.

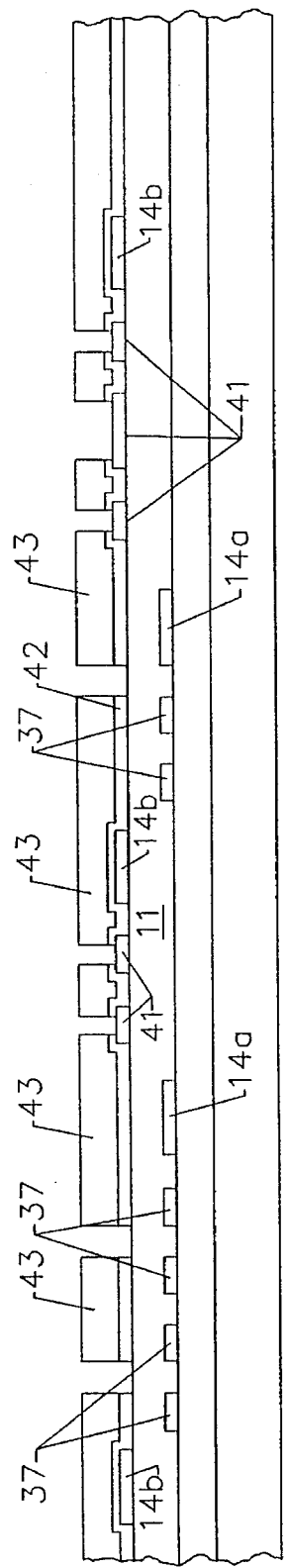
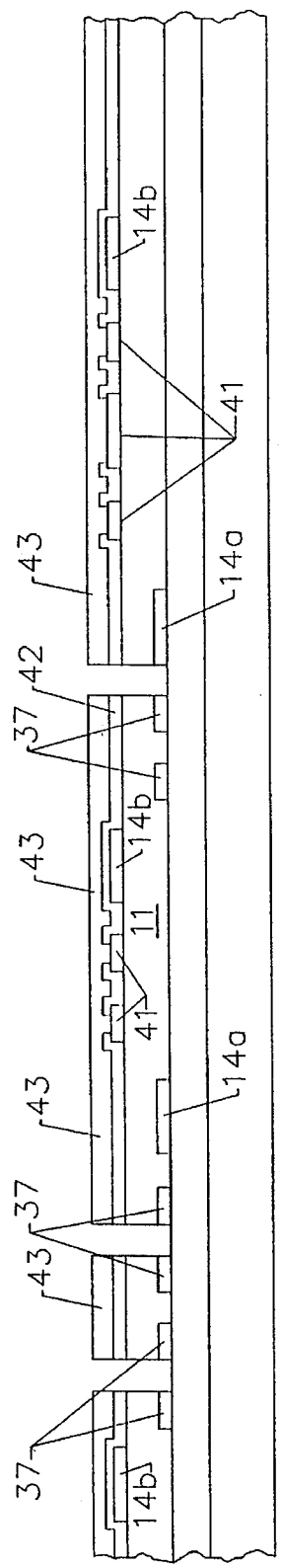
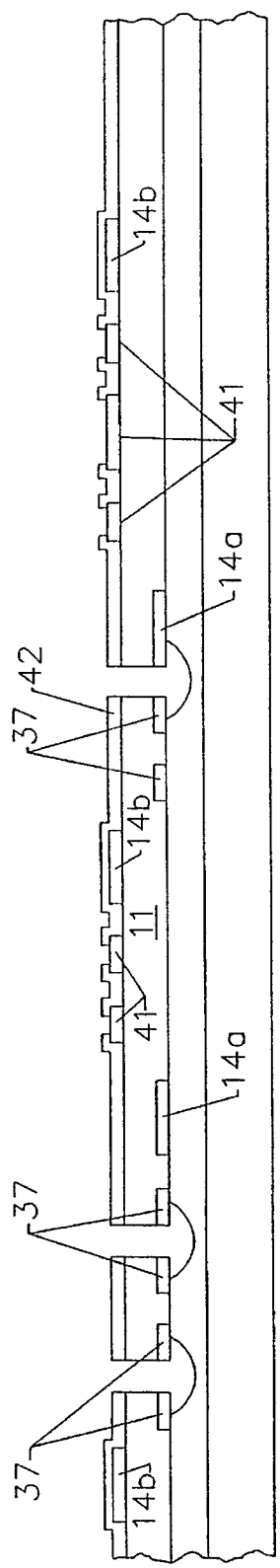

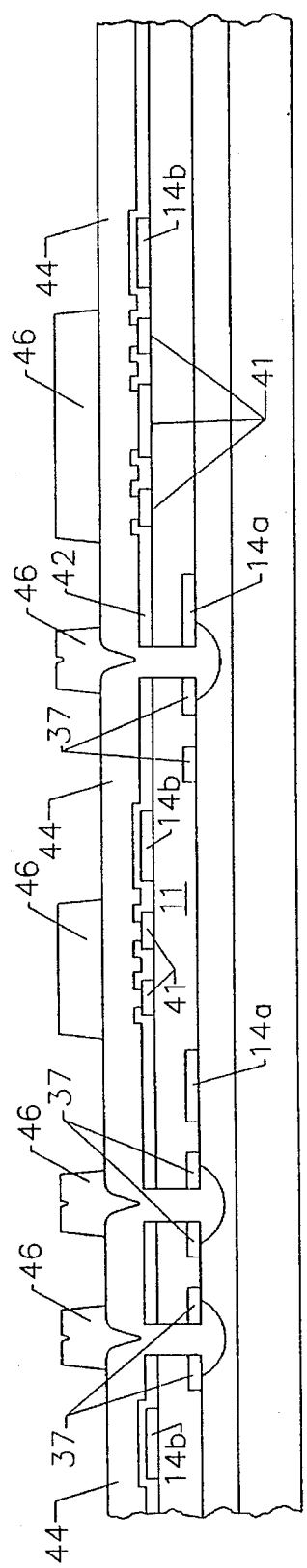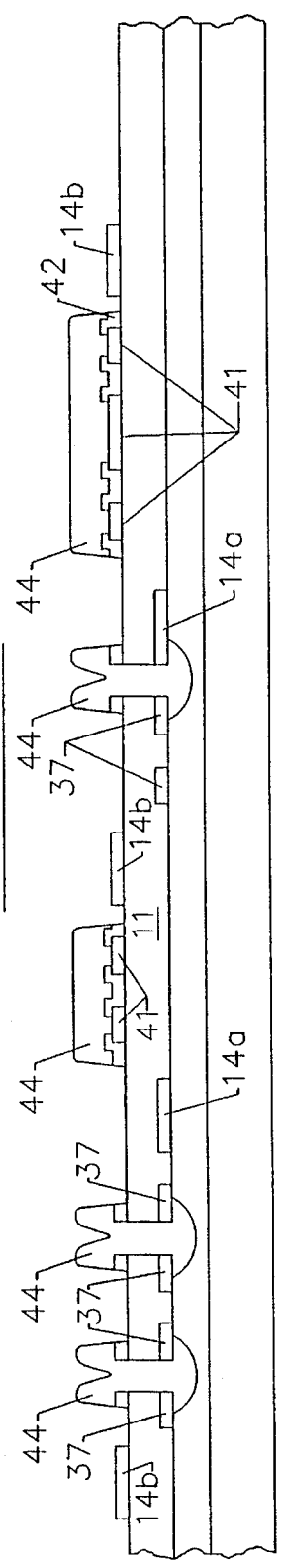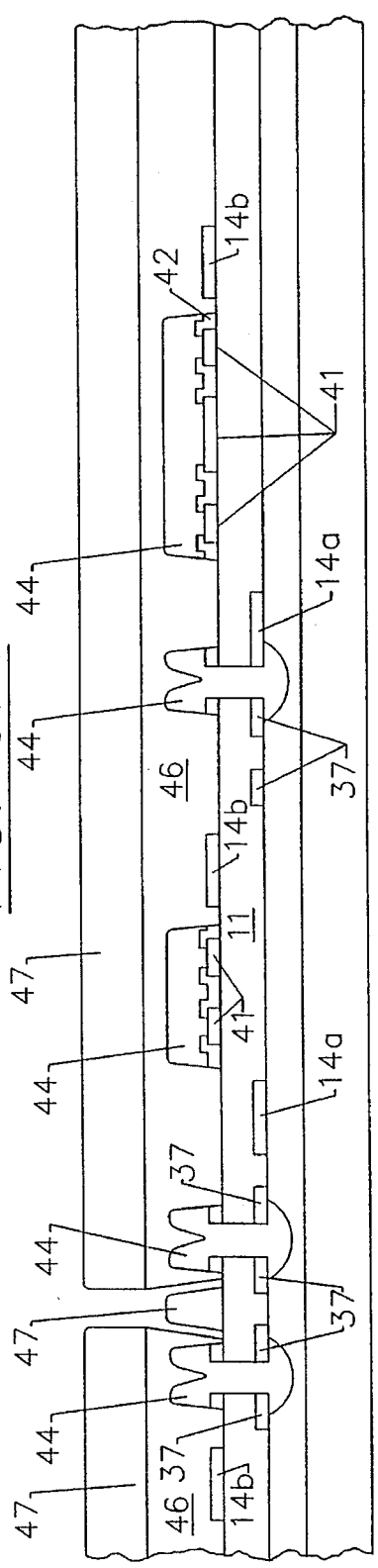

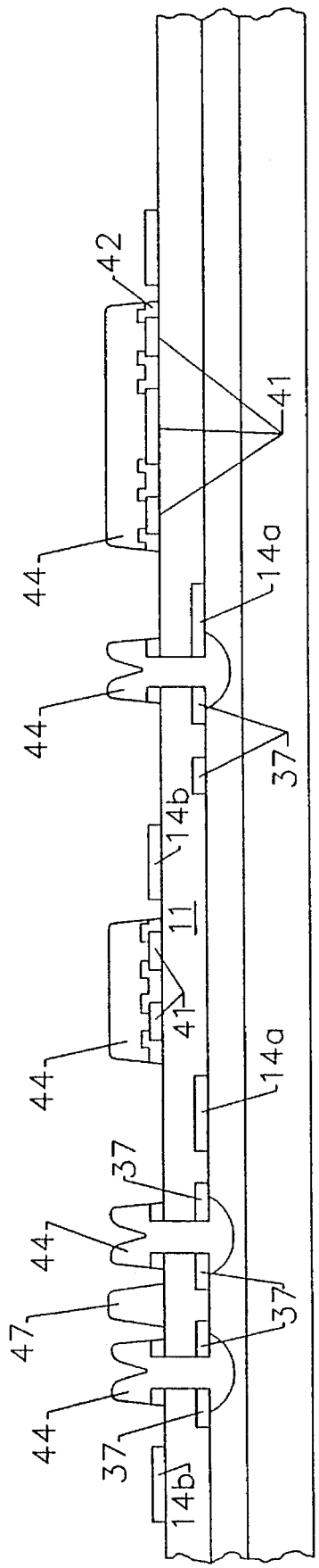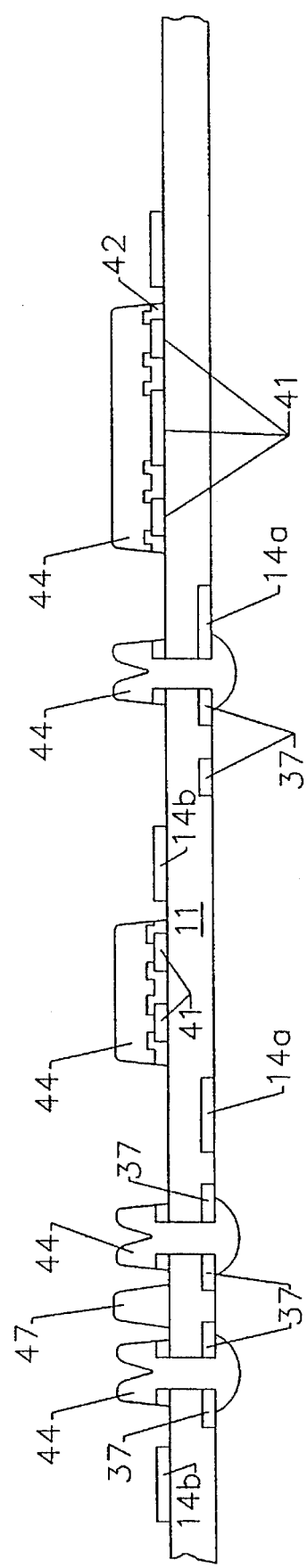

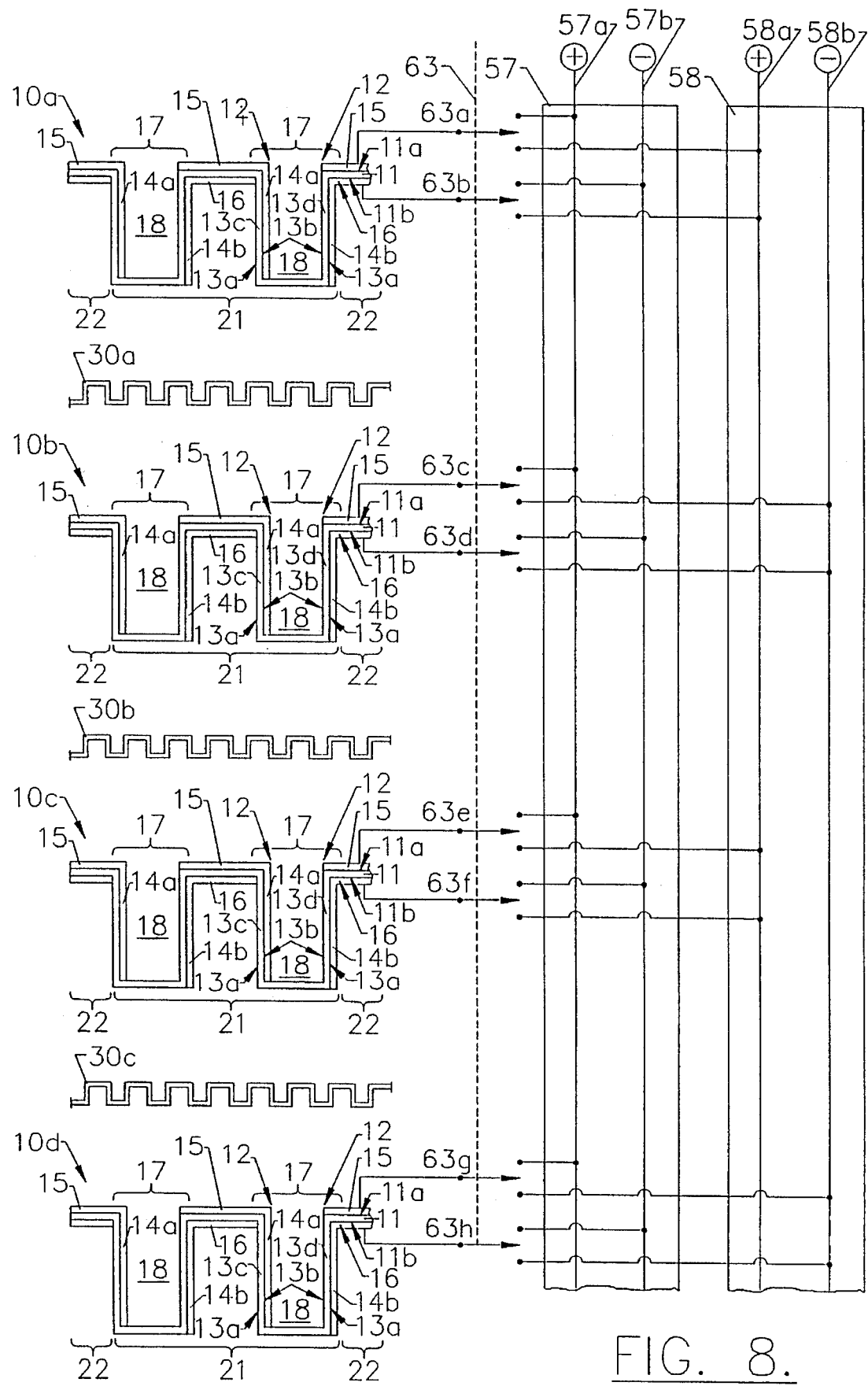

5,479,061

PLEATED SHEET MICROELECTROMECHANICAL TRANSDUCER

FIELD OF THE INVENTION

This invention relates to electromechanical transducers and more particularly to electromechanical transducers comprising microminiature elements and methods of fabricating same.

BACKGROUND OF THE INVENTION

A transducer may be broadly defined as a device which converts one form of input energy to a different form of output energy. An electromechanical transducer, when configured to convert electrical energy to mechanical energy, may operate on the principle of electrostatic attraction caused by two opposing and oppositely charged conducting plates. For example, when electrical energy is input to the transducer in the form of a voltage applied between the plates, the plates are drawn together. If the plates are free to move together, the input electrical energy is converted into mechanical energy.

The plates of an electromechanical transducer may also be used to generate electrical energy from an input of mechanical energy. For example, the plates are first charged by an electrical voltage applied to the plates. The plates may then be disconnected from the charging source and mechanical energy used to further separate the plates. As the plates are separated, the voltage between the plates increases thereby converting the mechanical energy to electrical energy.

Accordingly, an electromechanical transducer may be used either as an actuator, sensor or power supply. As an actuator, the transducer may convert electrical power into mechanical motion, and, as a sensor or power supply, the transducer may convert mechanical motion into an electrical signal.

Electromechanical transducers have been developed which convert electrical energy to mechanical motion and ultimately to acoustic energy by the application of a voltage between a pair of spaced parallel conducting plates. If the plates are flexible or otherwise configured to allow motion, the plates are drawn together by the force of electrostatic attraction when the signal voltage is applied between the plates. See, for example, U.S. Pat. No. 3,008,014 to Williamson et al., which discloses an electrostatic transducer used in entertainment loudspeaker systems to convert electrical signals into sound. Since the driving voltage required to move the plates is related to the square of the separation between the plates, transducers of the type described in Williamson et al. require large and potentially hazardous driving voltages.

As is known in the art, the force generated by a pair of opposing parallel charged plates is inversely proportional to the square of the distance between the plates. The force generated by the plates increases by a power of two for a corresponding linear decrease in the separation between the plates. Accordingly, very large forces can be developed as the spacing between plates is decreased. In addition, for a given force, as the separation is decreased, the driving voltage can be reduced. Accordingly, there has been widespread interest in the development and manufacture of microminiature electromechanical transducers, or "microelectromechanical" transducers.

To obtain useful forces and physical displacements as the size of the separation between plates is reduced, a large number of plates must be concatenated or stacked together. An early attempt at fabricating a microelectromechanical transducer is described in U.S. Pat. No. 2,975,307 to Schroeder et al. This patent discloses an electrostatic transducer having a large number of stacked plates, each plate with an individual and discrete external wiring connection to the source of the driving voltage, and each pair of adjacent plates having a series of separators positioned in a precise pattern therebetween.

Unfortunately, it is difficult to connect each of the plates to a supply voltage in an array having a large number of closely spaced plates. In an array of closely spaced stacked plates, many hundreds or even thousands of discrete connections must be made to each plate in the stacked array of plates. In addition, the physical assembly of such a large number of plates, spacers, and other components of such small dimensions is extremely difficult and not, therefore, amenable to efficient manufacturing.

The microelectronics art has been highly successful in fabricating extremely dense microelectronic structures. For example, one million or more transistors have been fabricated on an integrated circuit chip less than 1 $cm^2$ in area. Accordingly, attempts have been made to use microelectronics manufacturing principles and techniques to fabricate microelectromechanical transducers. For example, the Massachusetts Institute of Technology has fabricated a microminiature eight-pronged rotor that spins around a center bearing as more fully described in Howe, Muller, Gabriel, and Trimmer, "Silicon Micromechanics: Sensors and Actuators on a Chip," IEEE Spectrum, pp. 29–31 and 35 (July 1990). As described, friction and wear at the bearing points of rotating or sliding structures at these dimensions are of great importance and may readily cause the failure of such a device after only a few minutes of operation.

A major advance in the design and manufacture of microelectromechanical transducers is described in Copending application Ser. No. 07/619,183, now U.S. Pat. No. 5,206,557 filed Nov. 27, 1990 by coinventor Stephen M. Bobbio and entitled *Microelectromechanical Transducer and Fabrication Method*, the disclosure of which is hereby incorporated herein by reference. Described is an electromechanical transducer having a large number of conductive plates with a small separation between adjacent plates, and which avoids the need for individual discrete wiring to each plate.

The transducer of application Ser. No. 07/619,183, now U.S. Pat. No. 5,206,557 is formed of a plurality of electrically conductive strips arranged in an array, with adjacent portions of the strips being maintained in a closely spaced relation by a series of spacers positioned between the adjacent portions of the strips. The spacers have electrically conductive portions to distribute the electrical signal within the transducer, thereby forming an internal distribution network and obviating the need for discrete electrical connections to be made to each conductive strip in the transducer. The strips are preferably made of flexible dielectric material having an electrically conductive layer on selected outer surfaces thereof. The dielectric strips and spacers are preferably formed from a common dielectric layer using microelectronic fabrication techniques to thereby greatly simplify fabrication and avoid the need for assembling a myriad of microscopic elements.

Microelectromechanical transducers must be electrically and mechanically robust, so that they can be fabricated with high manufacturing yields and operated over extended periods of time without breakdown. In particular, because of the large numbers of electrical conductors which must be formed in a microelectromechanical transducer, the transducer should be designed so that electrical shorts do not occur during the manufacturing process and during operation over a normal lifetime. Moreover, the structure must be mechanically robust so that it can withstand the various manufacturing processes which are used to fabricate the structure, and can also withstand operation over an extended operational lifetime. Mechanical robustness is particularly important for microelectromechanical transducers, which by their very nature are required to move during normal operation.

The manufacturing processes for the microelectromechanical transducer should also produce high yields for the device. The manufacture of microelectromechanical transducers should also preferably use processes and materials which have heretofore been widely used in the manufacture of other microelectronic devices such as integrated circuits.

SUMMARY OF THE INVENTION

It is therefore an object of the invention to provide an improved microelectromechanical transducer.

It is another object of the invention to provide a microelectromechanical transducer which is mechanically robust so that it can withstand mechanical forces involved in manufacture, and operation over an extended lifetime.

It is yet another object of the invention to provide a microelectromechanical transducer which is electrically robust so that electrical isolation between its conductive lines can be maintained during manufacture and over extended operation.

It is still another object of the present invention to provide a microelectromechanical transducer which can be manufactured using known microelectronics manufacturing processes to provide high device yields.

These and other objects are provided, according to the present invention, by a microelectromechanical transducer which is formed of a pleated dielectric sheet having patterned electrical conductors on the opposing faces thereof. A plurality of spaced apart pleats in the sheet define a plurality of spaced apart walls. Each wall includes a conductive portion at one side thereof, with all of the conductive portions being oriented in the same predetermined direction, relative to the wall on which it is formed. First alternating ones of the conductive portions are electrically connected together and second alternating ones of the conductive portions are electrically connected together so that an electrical signal applied between the first and second conductive portions causes adjacent walls to move towards one another, by electrostatic attraction.

The wall between adjacent conductive portions prevents adjacent conductive portions from contacting one another during movement. Stated another way, the electrically conductive portions of adjacent walls are located at opposite ones of the first and second opposing sides of the walls, such that a wall and a space are between adjacent electrically conductive portions. Accordingly, an applied voltage causes the walls to move towards one another between the space therebetween, and the wall between adjacent conductive portions prevents adjacent conductive portions from contacting one another.

The pleats may also be viewed as forming an array of trenches in the sheet. Each of the trenches includes a first and second trench wall and a space therebetween, with the first and second trench walls having inner sides which face one another and outer sides which oppose one another. Each first wall includes a first conductive portion and each second wall includes a second conductive portion. The first conductive portion is at the inner side of the first wall and the second conductive portion is at the outer side of the second wall (or vice versa), so that one insulating wall and the space are between adjacent ones of the first and second conductive portions. The first conductive portions are all electrically connected together and the second conductive portions are all electrically connected together so that an electrical signal applied between the first and second conductive portions causes the first and second trench walls to move towards one another in the spaces therebetween. The trench wall between adjacent conductors prevents adjacent conductors from contacting one another.

A microelectromechanical transducer according to the present invention is formed of a dielectric sheet such as parylene, having a plurality of spaced apart pleats therein. Since the transducer is formed of a sheet, it is mechanically robust. It can withstand manufacturing processes and repeated movement. Moreover, adjacent conductive portions, carrying opposite voltages, are physically separated by a wall and a space. It is therefore difficult to short circuit the positive and negative voltages of the array during manufacture or operation. Finally, since the positive and negative voltages are on opposite faces of the sheet, there is a reduced probability of forming electrical short circuits during manufacture. An electrically robust transducer is thereby provided.

A microelectromechanical transducer is fabricated, according to the invention, by forming patterned electrical conductors on first and second opposing faces of an electrically insulating sheet and by forming a plurality of pleats in the electrically insulating sheet. The sheet may be formed with integral pleats. Alternatively a "self-pleating" flat sheet may be formed, which forms pleats after conductor fabrication thereon.

A method for fabricating the sheet with integral pleats uses a form or mold having trenches therein. A conformal insulating sheet is fabricated on the mold. The insulating sheet is metallized and the metallized sheet is released from the mold to produce the microelectromechanical transducer. The mold can be reused to form additional transducers.

In particular, a polyimide mold includes a plurality of trenches at one face thereof, according to the desired pattern of pleats. The mold may be coated with a release layer, such as polysiloxane, to allow later release of the transducer from the mold. The mold is metallized at an oblique angle so that the top of the mold and only one wall of each trench is metallized. A layer of parylene or other highly conformal insulator is then deposited on the top face of the mold and on the trench walls.

The structure is then metallized at an oblique angle opposite that of the original metallization, in order to form a conductor on the top surface of the parylene and on the opposite walls of the trenches from that originally formed. Then, the structure is immersed in aqueous hydrofluoric acid which permeates through the form and dissolves the release layer. The parylene/metal transducer floats free and the polyimide mold is available for reuse. The above described "integral pleat" method does not require any photolithography steps, other than to form the trenches in the reusable mold.

In another method according to the present invention, a flat, "self-pleating" sheet is formed. In particular, anchors are formed on the sheet. The anchors cause the sheet to pleat after it is fully formed. For example, a polyimide sheet having front and back metallization patterns may be formed, wherein the polyimide layer includes partially cured portions adjacent the anchors. After the device is fabricated, the partially cured polyimide is fully cured, which causes the partially cured polyimide to shrink about the anchors and fold the structure into pleats. Accordingly, a self pleating structure is formed.

The "integral pleat" fabrication method and the "self-pleating" fabrication method described above use known microelectronic processes such as etching, deposition and lift-off, and well known microelectronic materials such as polyimide and parylene. Accordingly, microelectromechanical transducers according to the present invention may be fabricated with high yields and without major reinvestment of capital equipment.

Another aspect of the present invention provides a microelectromechanical transducer which is capable of contraction by electrostatic attraction and expansion by electrostatic repulsion. A plurality of interleaved arrays, each of which includes a plurality of electrically conductive walls arranged in a closely spaced relation, is provided. Each array may be a microelectromechanical transducer as defined herein, a microelectromechanical transducer as defined in the aforesaid application Ser. No. 07/619,183, now U.S. Pat. No. 5,206,557 or any other microelectromechanical transducer which includes a plurality of electrically conductive walls arranged in closely spaced relation. Contracting means is provided, for applying an electrical signal between alternating electrically conductive walls in each of the interleaved arrays, such that adjacent walls of each array move towards one another by electrostatic attraction, and the plurality of interleaved arrays contract. Expanding means are also provided for applying an electrical signal between all the electrically conductive walls in alternating ones of the interleaved arrays, such that adjacent walls in each array move away from one another by electrostatic repulsion, and the plurality of interleaved arrays expand.

Each array may include first connecting means for electrically connecting first alternating ones of the electrically conductive walls, and second connecting means for electrically connecting second alternating ones of the electrically conductive walls, as described above. In this arrangement, the contracting means can be implemented by applying an electrical signal between each of the first connecting means and each of the second connecting means. The expanding means can be implemented by applying an electrical signal between the first and second connecting means in alternating ones of the interleaved arrays. Accordingly, expansion and contraction may be provided. The arrays may be interleaved in a planer configuration by stacking insulated arrays upon each other, or interwound in a spiral configuration by winding insulated arrays around each other and around a common axis, such that linear or circular expansions and contractions are produced.

BRIEF DESCRIPTION OF THE DRAWINGS

FIGS. 2A and 2B illustrate side views of the transducer of FIG. 1 in a relaxed and a contracted state, respectively.

FIGS. 6A–6L illustrate side cross-sectional views of a microelectromechanical transducer according to the present invention during alternative intermediate fabrication steps.

FIG. 8 illustrates a schematic cross-sectional view of a microelectromechanical transducer which is capable of expansion and contraction according to the present invention.

DETAILED DESCRIPTION OF PREFERRED EMBODIMENTS

Figure 1:
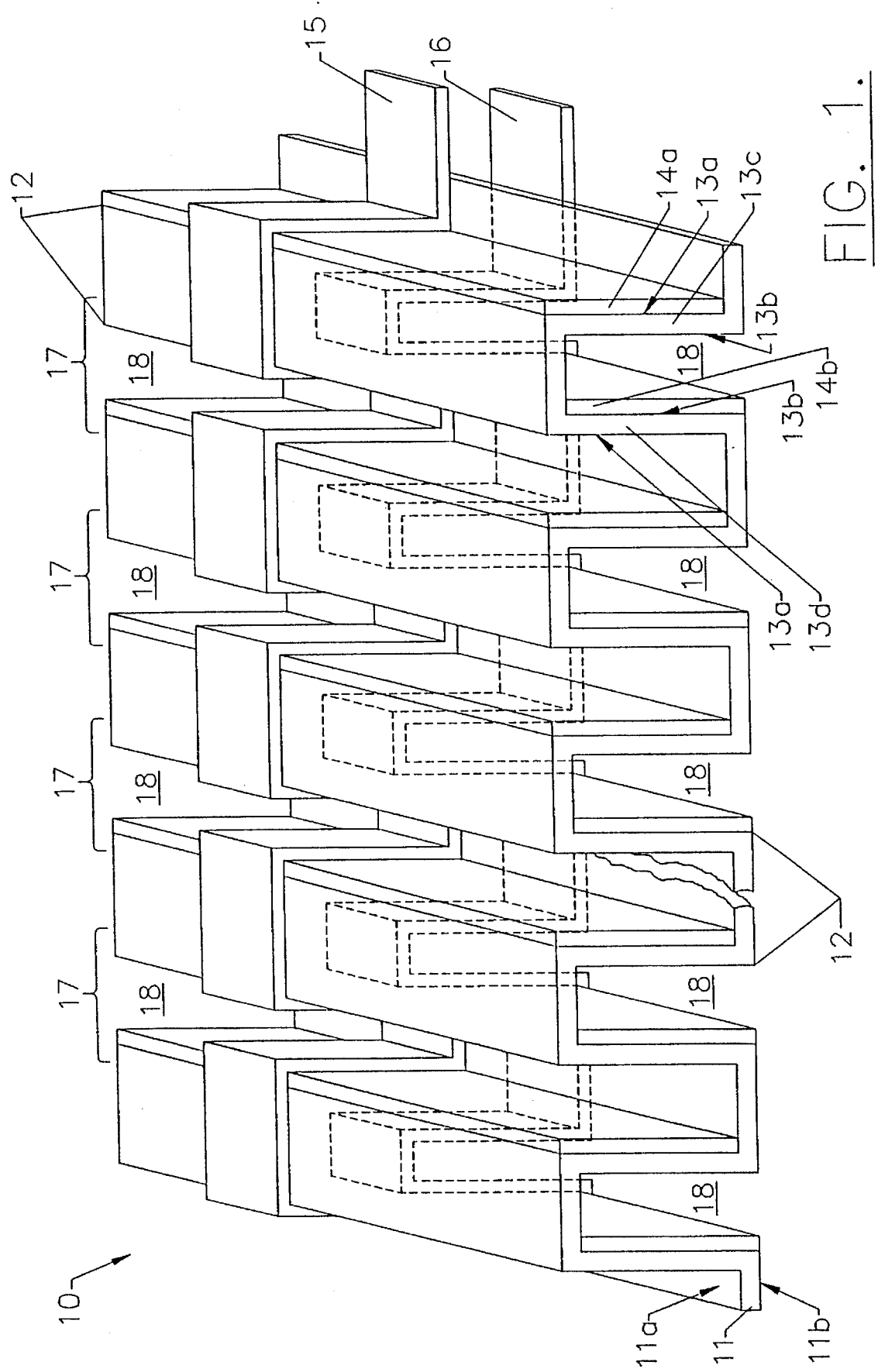
FIG. 1 illustrates a front perspective view of a first embodiment of a microelectromechanical transducer according to the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout.

Referring now to FIG. 1, a front perspective view of a microelectromechanical transducer according to the present invention is shown. As shown in FIG. 1, transducer 10 is formed of a sheet 11, preferably a flexible dielectric or insulating sheet such as polyimide, having a first (top) face 11a and a second (bottom) face 11b. A plurality of spaced apart folds or pleats 12 are formed therein, to define a plurality of spaced apart walls 13c, 13d. As shown in FIG. 1, two pleats are formed between each pair of adjacent spaced apart walls. However, it will be understood by those having skill in the art that a single pleat can be used to form a pair of walls having v-shaped cross-section, and more than two pleats can be formed as well. Each wall 13c, 13d includes a first side 13a formed of the first face 11a of sheet 11, and a second opposing side 13b formed of the second face 11b of sheet 11.

Still referring to FIG. 1, each wall also includes an electrically conductive portion 14a, 14b, preferably an electrically conductive layer, formed thereon. As shown, a first electrically conductive portion 14a is formed on the first sides 13a of alternating walls 13c in first face 11a of sheet 11, while a second electrically conductive portion 14b is formed on second sides 13b of alternating walls 13d in second face 11b of sheet 11. The second sides 13b of walls 13c and the first sides 13a of walls 13d are free of electrically conductive portions. Accordingly, the electrically conductive portion of adjacent walls is located at opposite ones of the first and second opposing sides 13a and 13b so that a wall portion and a space 18 are between adjacent electrically conductive portions 14a, 14b.

The electrically conductive portions 14a on the first face 11a define a first conductor group and the electrically conductive portions on the second face 11b define a second conductor group. A first connecting means 15, such as a conductor line on first face 11a electrically connects all of the first conductors 14a, and a second connecting means 16, such as a second conductor line on second face 11b, electrically connects all of the second electrically conductive portions 14b. Accordingly, as shown in FIG. 1, first conducting line 15 forms a serpentine pattern in side view on first face 11a of sheet 11, while second conducting line 16 forms a serpentine pattern in side view on second (bottom) face 11b of sheet 11.

FIGS. 2A and 2B illustrate side views of the transducer of FIG. 1 in a relaxed (unpowered) and a contracted (powered) state. As shown, when an electrical signal is applied between the first connecting means 15 and the second connecting means 16, adjacent walls 13c, 13d move towards one another in the space 18 therebetween by electrostatic attraction between the positively and negatively charged conductive portions 14a and 14b. Accordingly, the entire transducer contracts, with the ends of the transducer moving towards one another. Since the movement occurs due to electrostatic attraction, the transducer need not be immersed in a magnetic field. The wall between adjacent conductors prevents adjacent conductors from contacting one another and creating an electrical short circuit. All of the conductive layers on the walls are oriented in the same predetermined direction, i.e. they extend to the right from the associated wall in the illustrations of FIGS. 1, 2A and 2B.

As shown in FIGS. 1, 2A and 2B, the microelectromechanical transducer 10 is formed on a continuous, pleated, flexible insulating sheet 11. Since the sheet is a continuous sheet, a mechanically robust transducer is provided, which can withstand the rigors of manufacturing, and the rigors of many repetitive contractions and relaxations illustrated in FIGS. 2B and 2A, respectively. Moreover, the first electrical connection means 15 and the first conductive portions 14a which are electrically connected thereto are formed on the first face 11a of sheet 11, while the second electrical connection means 16 and the electrically conductive portions 14b connected thereto are formed on the second face 11b of sheet 11. Accordingly, the "positive" and "negative" signal carriers are on opposite faces of the sheet 11, thereby reducing the probability of short circuits. Moreover, upon contraction, a wall always separates adjacent conductors so that electrical contact is not allowed between adjacent conductors. Accordingly, an electrically robust transducer is also provided.

The spaced apart pleats 12 in sheet 11 of FIG. 1 may also be regarded as defining an array of trenches 17, each of which has a first and a second trench wall 13c, 13d respectively, and a space 18 therebetween. The first and second trench walls include inner sides 13a which face one another and outer sides 13b which oppose one another. Accordingly, the first conductive portion 14a is on the inner side 13a of the first wall 13c and the second conductive portion is on the outer side 13b of the second wall 13d. The inner side 13a of the second wall 13d and the outer side 13b of the first wall 13c are free of electrically conductive portions thereon. When the electrical signal is applied between first and second connecting means 15 and 16 respectively, the first and second trench walls of each trench move toward one another in the space 18 therebetween and the trench wall between adjacent conductors prevents adjacent conductors from contacting one another.

Figure 3:
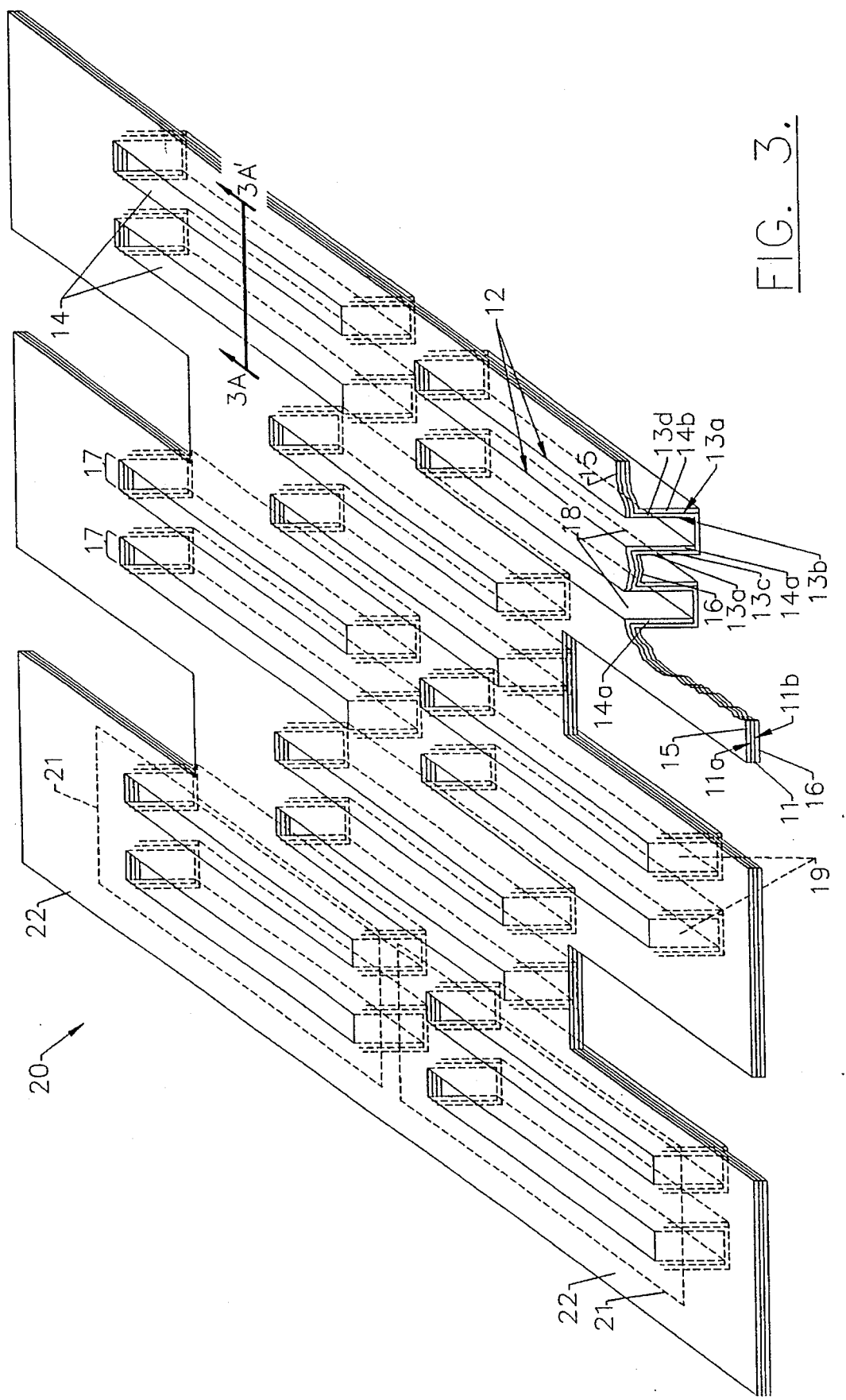
FIG. 3 illustrates a front perspective view of a second embodiment of a microelectromechanical transducer according to the present invention.

Referring now to FIG. 3, a second embodiment of a microelectromechanical transducer according to the present invention is illustrated. In transducer 20, the trenches 17 are formed in an interior portion 21 of sheet 11 and are surrounded by a peripheral portion 22 of sheet 11. Also, the first and second connecting means 15 and 16 respectively, are formed on the peripheral portions 22 of the sheet 11, with the first connecting means 15 being formed on the first face 11a in the peripheral portions 22 of the sheet 11 and the second connecting means 16 being formed on the second face 11b in the peripheral portions of sheet 11. Each wall 13c, 13d includes a first side 13a formed of the first face 11a of sheet 11, and a second opposing side 13b formed of the second face 11b of sheet 11. Each wall also includes an electrically conductive portion 14a, 14b, preferably an electrically conductive layer, formed thereon. Finally, trenches 17 may include end portions 19 at each end thereof.

Figure 4A:
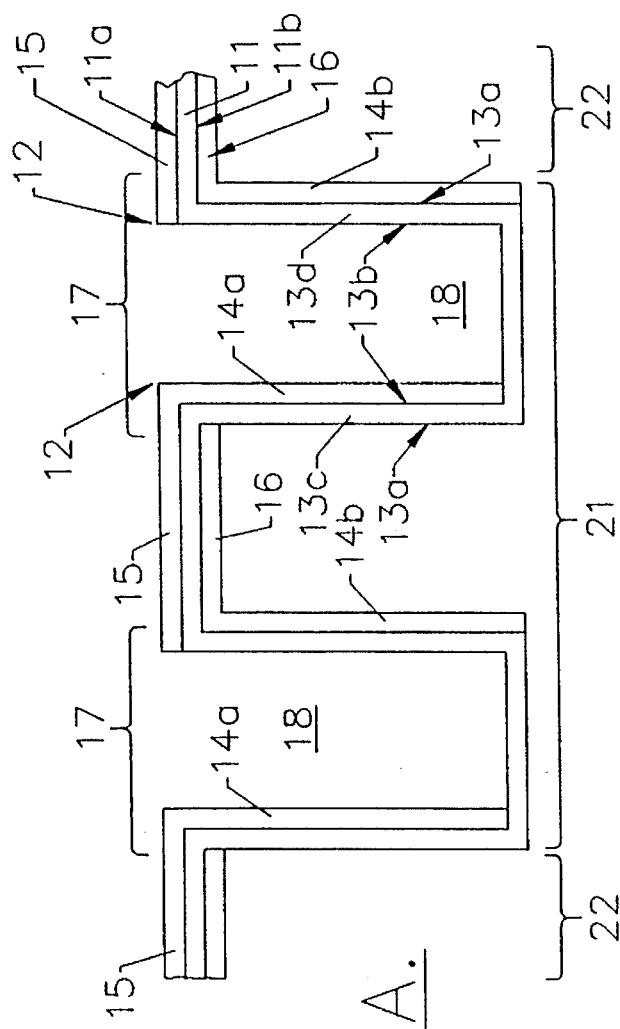
FIGS. 4A and 4B illustrate cross-sectional views of the transducer of FIG. 3 in the relaxed and contracted state, respectively.
Figure 4B:
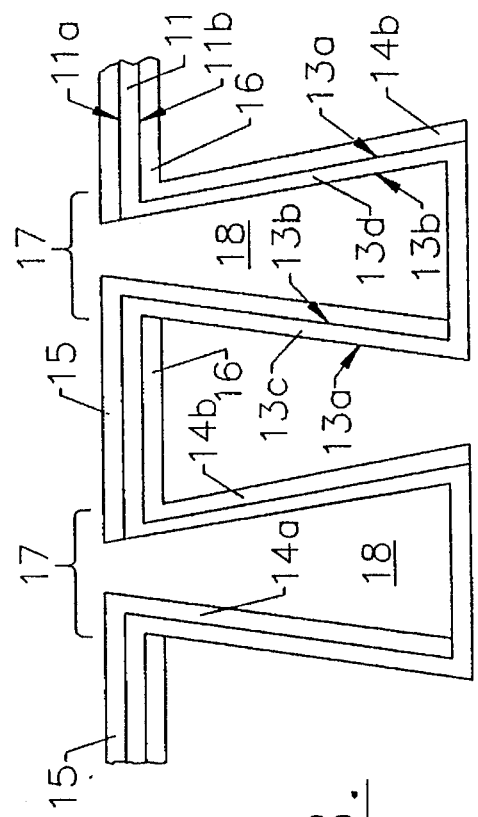
Figure 4C:
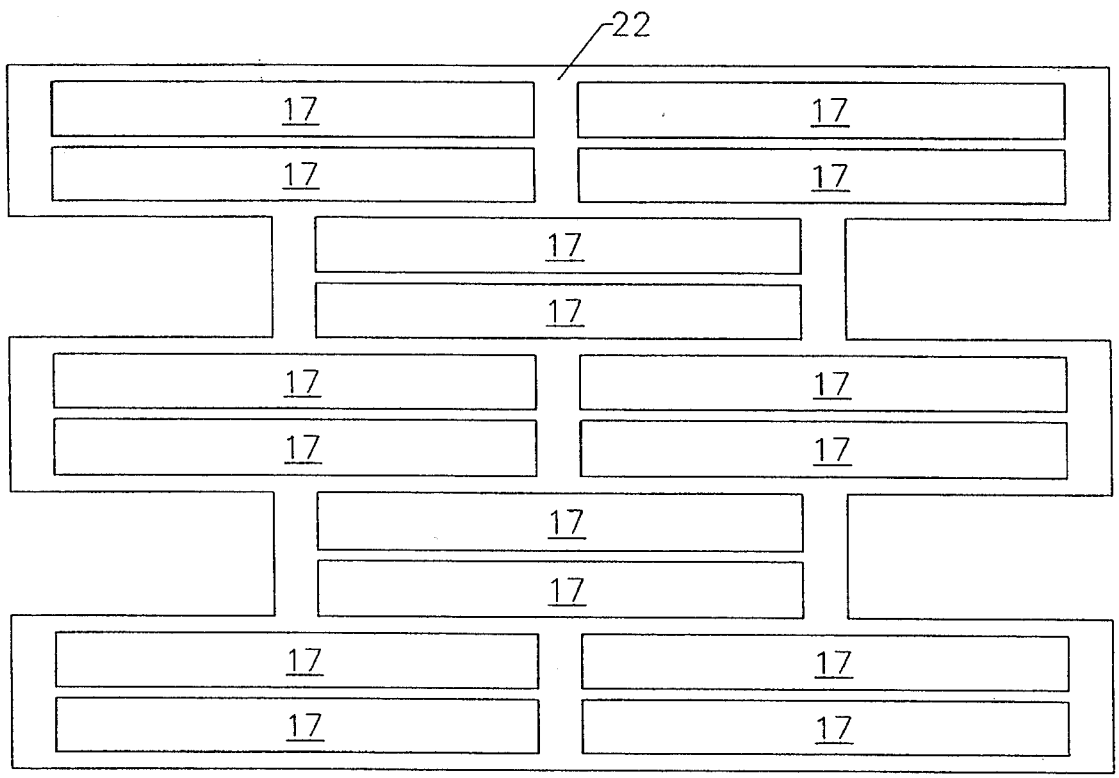
FIGS. 4C and 4D illustrate plan views of the transducer of FIG. 3 in the relaxed and contracted state., respectively.
Figure 4D:
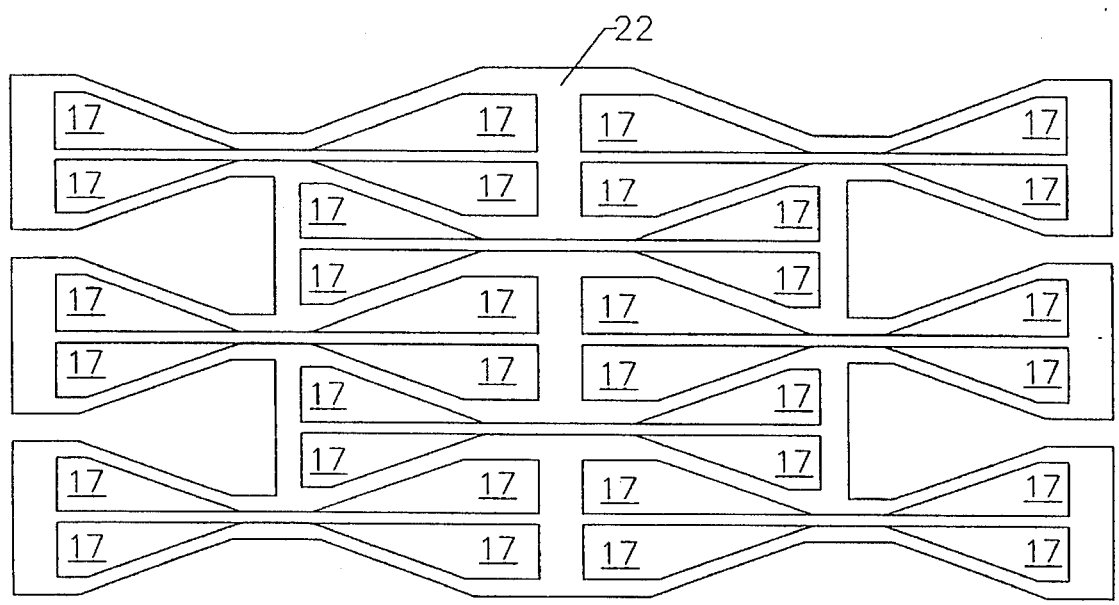

FIGS. 4A and 4B illustrate cross-sectional views of transducer 20 along the line 3A—3A' in the relaxed (unpowered) state and the contracted (powered) state, respectively. FIGS. 4C and 4D illustrate plan views of the transducer 20 in the relaxed (unpowered) state and contracted (powered) state, respectively. It will be understood by those having skill in the art that the pleated sheet transducers 10 or 20 typically include many trenches 17 which may be placed in staggered arrays or in one or more linear arrays. Some arrays may be formed in one direction whereas other arrays may be formed in another direction to provide x-y motion. Some possible arrangements of arrays are described in the aforesaid Copending application Ser. No. 07/619,183, now U.S. Pat. No. 5,206,557 the disclosure of which is hereby incorporated herein by reference.

The transducers according to the present invention need not be very small, although the individual features such as trenches are typically very small. Using currently available Very Large Scale Integration (VLSI) technology, the total array length will typically be on the order of 15 cm or less. Each trench may be on the order of 1 µm wide and 20 µm long. Up to $4 \times 10^8$ or more trenches may be formed in a single array.

Fabrication methods for the transducers of the present invention will now be described. Two general fabrication methods will be described. In the first method, described in FIGS. 5A–5F, the sheet is formed with integral pleats. In the second method described in FIGS. 6A–6L, a "self-pleating" sheet is formed, which pleats after it has been metallized.

Referring now to FIGS. 5A–5F, a method for fabricating a microelectromechanical transducer including an integrally pleated sheet will now be described. In general, the method fabricates a pleated sheet transducer on a form or mold having trenches therein, and then removes the pleated sheet transducer from the mold to provide a freestanding electromechanical transducer. The mold is reused to fabricate additional transducers. It should be noted that, apart from forming the mold itself, no critical lithographic steps are needed to form the transducer.

Figure 5A:
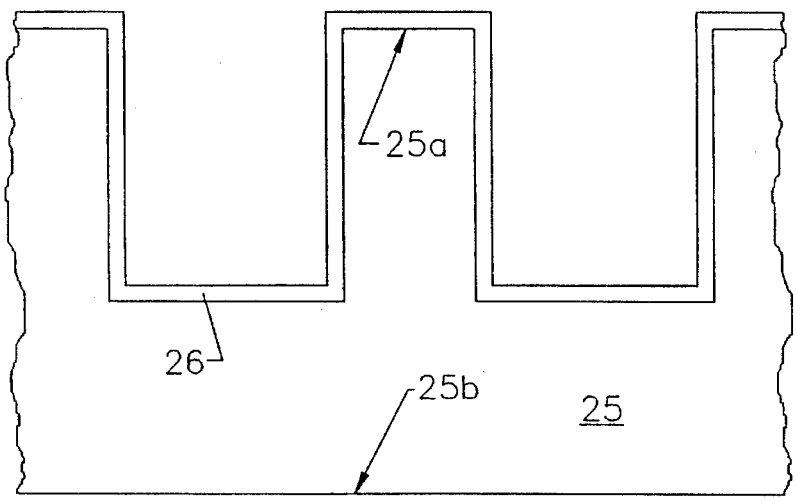
FIGS. 5A–5F illustrate side cross-sectional views of a microelectromechanical transducer according to the present invention during intermediate fabrication steps.

In particular, referring to FIG. 5A, the method begins with a form or mold 25 which has appropriate trenches formed therein according to the desired dimension of trenches 17 (FIG. 3). The form 25 is preferably a polyimide form, because the polyimide is permeable to aqueous hydrofluoric acid as will be described below. The form 25 may be self supporting. Alternatively, it may be attached to a support ring (not shown) or a substrate (not shown) having channels therethrough so that hydrofluoric acid can gain access to the bottom 25b of form 25.

A thin (less than about 1000 Å thick) release layer, for example polysiloxane or another material which is attacked by aqueous hydrofluoric acid, is conformally deposited on the top surface 25a of form 25. As is well known to those having skill in the art, polysiloxane may be conformally deposited over a multilevel topology in a thin layer as described in a publication entitled *Silane Coupling Agent Chemistry*, by Arkles, Silicon Compounds Register and Review, 1987, Petrarch Systems, pp. 54–59, the disclosure of which is incorporated herein by reference.

Figure 5B:
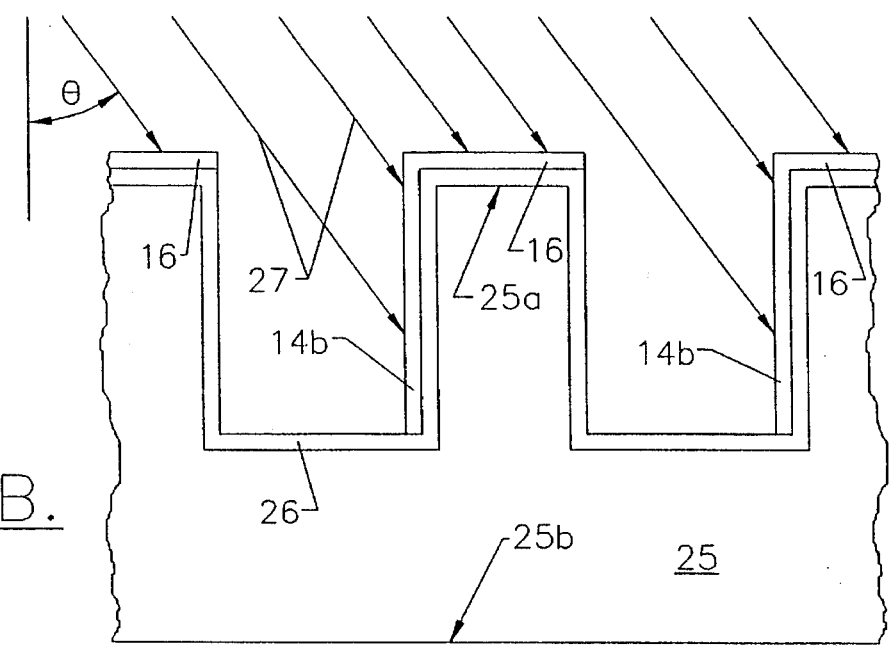

Referring now to FIG. 5B, a metal layer, such as a chromium layer about 800 Å thick, is deposited at an oblique angle θ as shown by arrows 27. This "shadow" deposition utilizes the trenches in the mold to selectively deposit electrically conductive portions 14b on the right walls of the trenches and to simultaneously deposit a second connecting means 16 on the top surface 25a of the form 25.

Figure 5C:
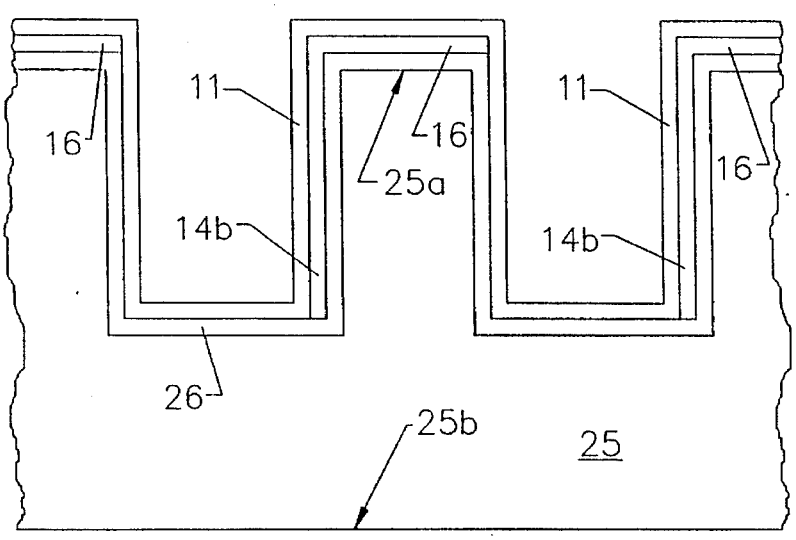

Then, referring to FIG. 5C, an insulating sheet 11 or layer, preferably parylene, is conformally deposited on top surface 25a including the trench walls and trench bottoms. Parylene and its properties are described in a publication entitled *Parylene Conformal Coatings Specifications and Properties*, published by Specialty Coating Systems, Inc., 1992, Union Carbide, the disclosure of which is incorporated herein by reference. As is well known to those having skill in the art, parylene polymers can be formed as structurally continuous films from as thin as a fraction of a micrometer to as thick as several mils. Preferably, a parylene layer about 0.2–2.0 μm thick is deposited to form insulating sheet 11.

Figure 5D:
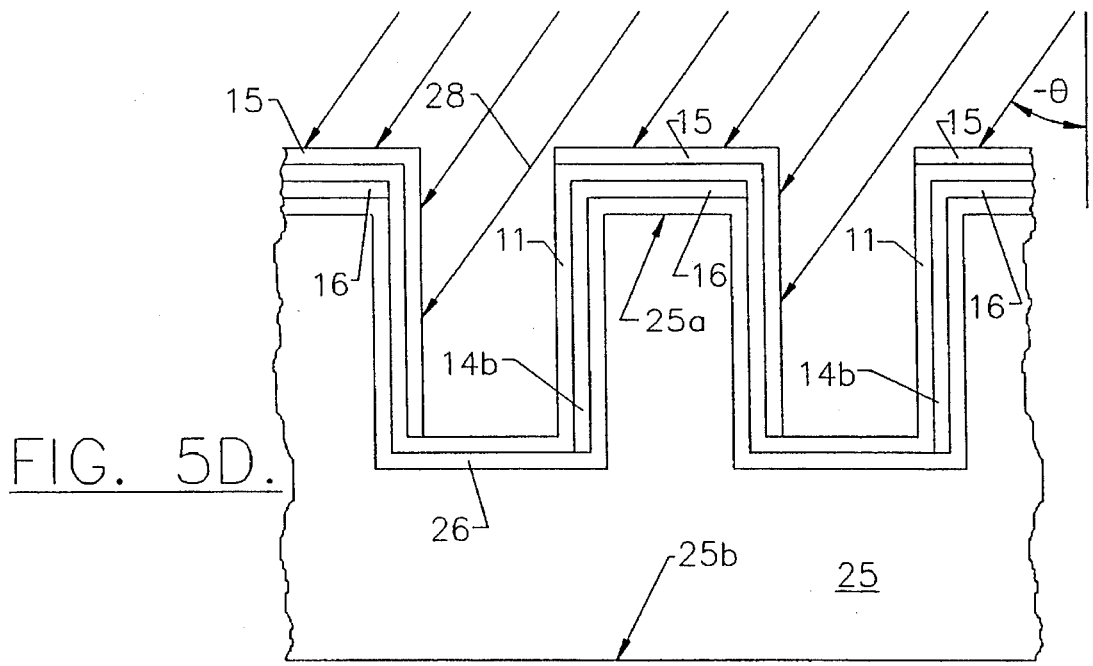

Referring now to FIG. 5D, a second shadow deposition of metal is formed, at an oblique angle −θ which is opposite that shown in FIG. 5B, to form first connecting means 15 and to form first electrically conductive portions 14a on the left hand trench walls. Metal layers 14a and 15 are also preferably about 800 Å thick.

Figure 5E:
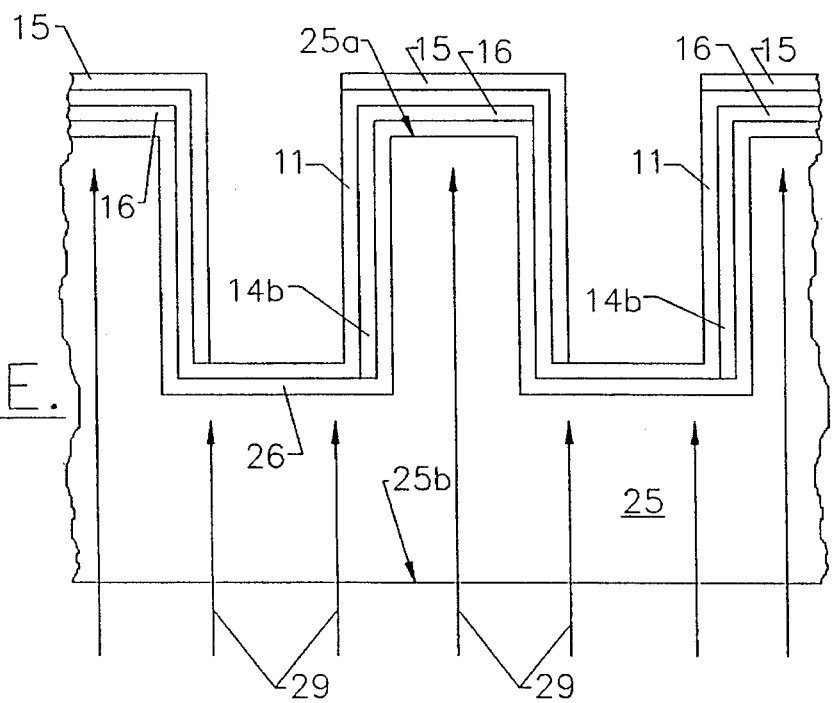
Figure 5F:
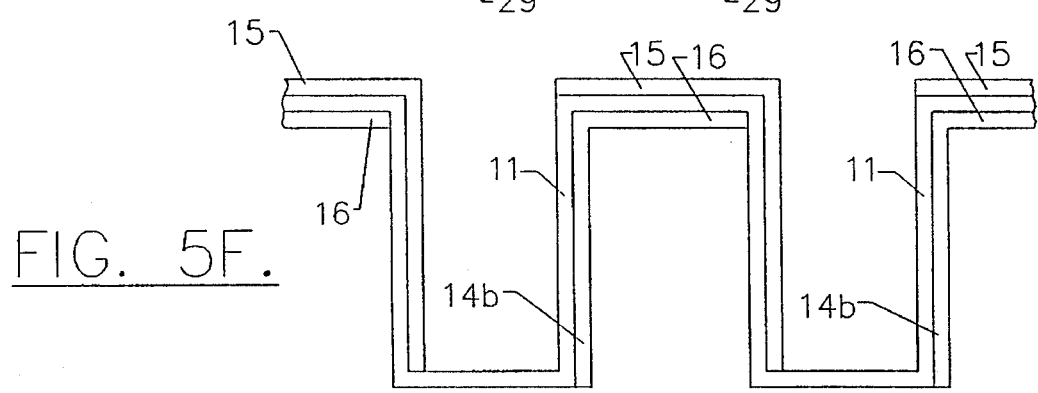

Referring now to FIG. 5E, the structure of FIG. 5D is immersed in aqueous hydrofluoric acid, which permeates the form 25 from the bottom surface 25b in the direction shown by arrows 29, and dissolves the release layer 26. The parylene sheet 11 and the metal layers thereon are impervious to the hydrofluoric acid. By dissolving the release layer 26, the micromechanical transducer floats free of the form 25 as shown in FIG. 5F. The form 25 is then available for reuse. Accordingly, the pleated sheet is fabricated with integral pleats. The bottom face metallization is formed prior to fabricating the pleated sheet and the top metallization is formed on the pleated sheet. The entire structure is then released from the form, to produce a freestanding microelectromechanical transducer.

Referring now to FIGS. 6A–6L, a method for fabricating a self-pleating electromicromechanical transducer according to the present invention will now be described. In general, a release layer such as low temperature oxide is formed on a substrate such as a silicon wafer. A first metal layer including anchors is patterned on the oxide and a first polyimide sheet is formed on the first metal layer. The first polyimide sheet is cured. A second patterned metal layer including anchors is formed on the cured first polyimide sheet. A shrinkable region is formed adjacent each anchor. In particular, trenches are selectively etched through the first cured polyimide sheet adjacent the anchors, and the trenches are filled with a second polyimide sheet which is only partially cured. The entire structure is then removed from the silicon wafer by dissolving the release layer. The second polyimide layer is then cured which causes the second polyimide sheet to shrink and fold the structure into pleats about the anchors. A detailed process flow for forming a self-pleating structure will now be described.

Figure 6A:
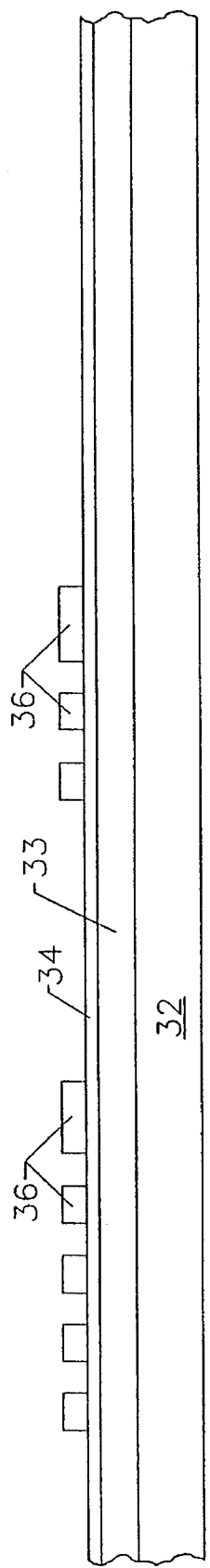

Referring now to FIG. 6A, the method begins by forming a release layer 33, for example a layer of low temperature oxide about 4000 Å thick, on a substrate 32 such as a silicon wafer. A first metal layer 34, such as 800 Å of chromium, is deposited on low temperature oxide layer 33. A resist layer 36 is then formed and patterned on first metal layer 34.

Figure 6B:
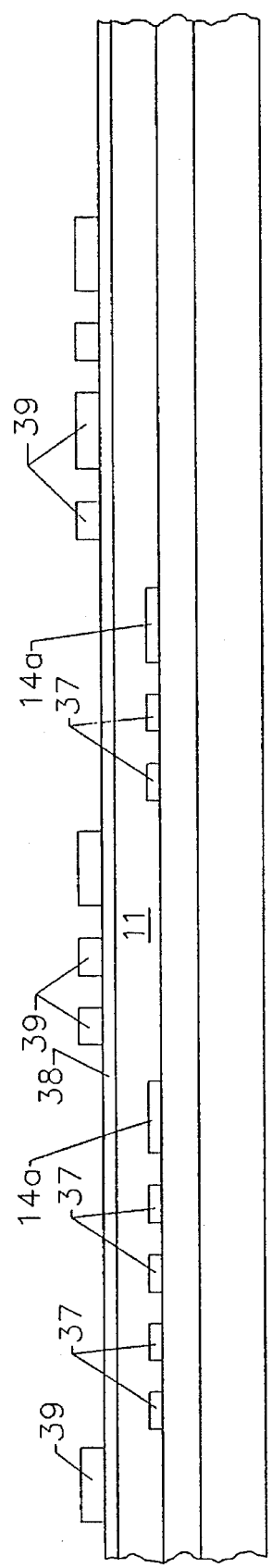

Then, as shown in FIG. 6B, first metal layer 34 is etched using patterned resist layer 36 as a template, to form electrically conductive portions 14a and to form a first set of anchors 37 for self-pleating as will be described below. Sheet 11 is then formed on the structure, for example, by spinning on a layer of polyimide about 0.2–2.0 μm thick. The polyimide sheet 11 is then fully cured. A second metal layer 38 is then formed on polyimide sheet 11. Second metal layer 38 may be formed of the same material and thickness as first metal layer 34. A second photoresist layer 39 is then formed and patterned on second metal layer 38.

Figure 6C:
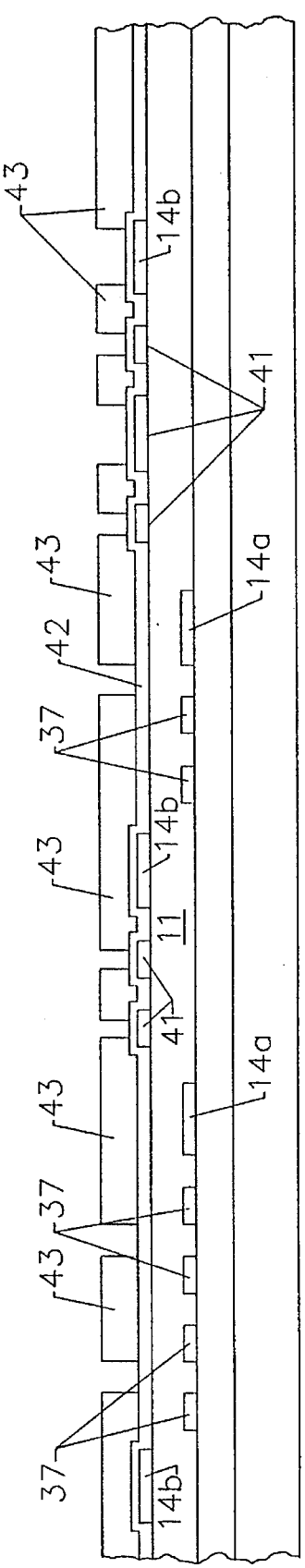

Referring now to FIG. 6C, the second metal layer 38 is then etched using second photoresist 39 to form second electrically conductive portions 14b on the second face of polyimide sheet 11, and also to form a second set of anchors 41. The second resist layer 39 is then removed. Then, a thin layer 42 is conformally applied. Layer 42 serves as an etch stop layer for a subsequent etch and also serves as an anti-adhesion layer between polyimide sheet 11 and a subsequently deposited second polyimide sheet. Layer 42 may be, for example, a layer, about 1000 Å thick, of spun-on glass which may be applied by standard VLSI spin coating and oven curing techniques. As is well known to those having skill in the art, spun-on glass is an effective etch stop for oxygen reactive ion etching, and polyimide does not adhere thereto. A third resist layer 43 is then formed and patterned on layer 42. Layer 43 is patterned at the places where pleats are to be formed in the polyimide sheet 11.

Then, referring to FIG. 6D, patterned third resist layer 43 is used as a template for patterning layer 42. For example, a reactive ion etch in carbon tetrafluoride ($CF_4$) may be used to pattern layer 42.

Referring now to FIG. 6E, a dry etch, such as a reactive ion etch in oxygen, is performed to etch polyimide sheet 11 down to low temperature oxide layer 33. As shown in FIG. 6E, some of the third resist layer 43 is also removed in this step. Accordingly, third resist layer 43 should be thicker than the polyimide sheet 11. For example, if the third level resist layer is 1 μm thick and the polyimide is 0.5 μm thick, then about a 0.5 μm of resist will remain after the polyimide is etched.

Referring now to FIG. 6F, a nondirectional etch of low temperature oxide layer 33 is performed to form the undercut profile shown in FIG. 6F. This etch may be performed, for example using aqueous hydrofluoric acid or using a buffered oxide etch. The third resist layer 43 is then removed.

Referring now to FIG. 6G, a second polyimide sheet 44 is spun-on and only partially cured. The spun-on polyimide sheet fills the undercut profile in the release layer 33 and fills the etched holes in first polyimide sheet 11. The polyimide is only partially cured, for example by heating at about 120 C.° for about 30 minutes, so as to form a stable polyimide sheet. Full cure is not performed at this time because the second polyimide sheet 44 will later be fully cured to pleat first polyimide sheet 11. Then, as shown in FIG. 6G, a fourth resist layer 46 is formed and patterned on the second polyimide sheet 44.

As shown in FIG. 6H, the fourth resist layer 46 is used to etch second polyimide layer 43, for example using an oxygen reactive ion etch. The fourth resist layer 46 is then removed, for example by dissolving it in acetone, and layer 42 is removed, for example using a reactive ion etch in sulfur hexafluoride ($SF_6$) or carbon tetrafluoride ($CF_4$).

Referring now to FIG. 6I, an optional lift-off resist 48, such as an image reversed photoresist, is then deposited and patterned and an optional third metal layer is deposited on resist layer 48. The lift-off resist 48 is then dissolved to wash away the metal layer 47 thereon with metal layer 47 which is on sheet 11 remaining. See FIG. 6J. The remaining metal layer 46 forms an optional strengthening bar over the pleat, as will be seen on FIGS. 6L and 7.

Then, referring to FIG. 6K, the entire patterned membrane structure is lifted off from silicon wafer 32 by dissolving low temperature oxide layer 33. For example, the structure may be immersed in aqueous hydrofluoric acid to dissolve the low temperature oxide layer 33 so that the membrane floats free of the substrate.

Figure 6L:
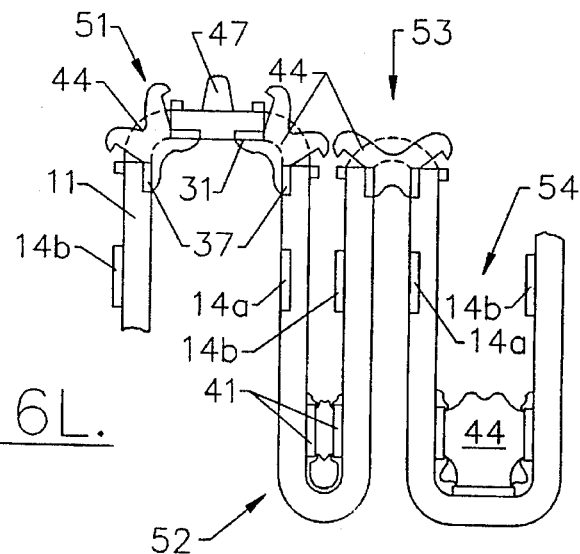

Then, referring to FIG. 6L, the membrane is removed from the lift-off bath and polyimide sheet 44 is fully cured by baking at about 400° C. No volume change occurs to first polyimide sheet 11 since it has already been fully cured at 400° C. However, second polyimide layer 44 shrinks and folds up the structure about the anchors 37 and 41 to form pleats. As shown, the second polyimide sheet 44 is anchored to first anchors 37 and second anchors 41 but is not anchored to first polyimide sheet 11 or any other layers.

Figure 7:
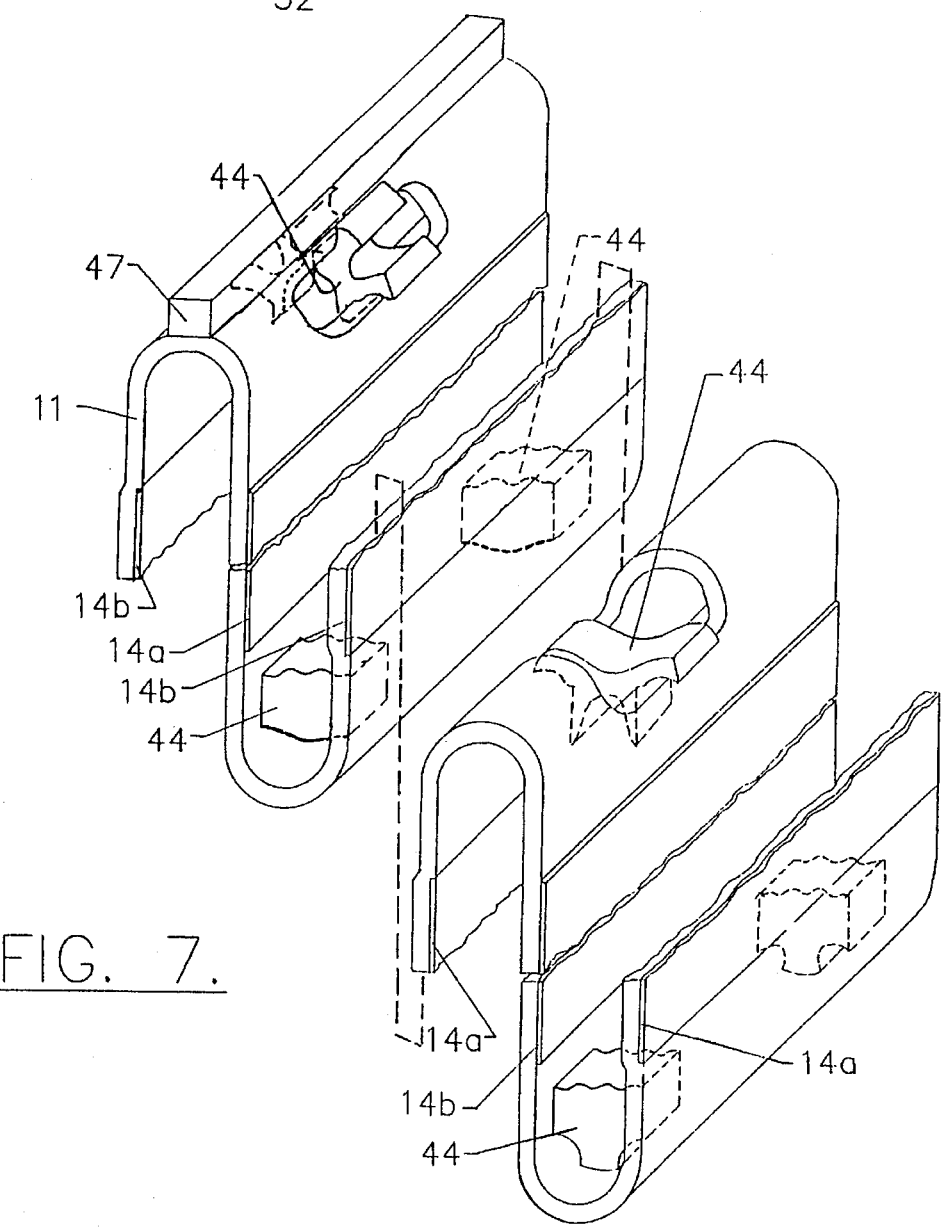
FIG. 7 illustrates a front perspective view of the structure of FIG. 6L.

As shown in FIG. 6L, the self-pleating structure includes four types of pleats: a double downward 90° pleat 51, a 180° upward pleat 52, a 180° downward pleat 53 and a double 90° upward pleat 54. Typically, an electromechanical transducer will include only 90° or 180° pleats. However, all the pleats have been included in FIGS. 6A–6L to illustrate how they can all be fabricated using the same basic steps. FIG. 7 illustrates a front perspective view of the structure of FIG. 6L.

Referring now to FIG. 8, a microelectromechanical transducer which is capable of contracting and expanding will now be described. All of the transducers heretofore described are capable of contracting upon application of an electrical signal between the first and second connecting means, and relaxing in the absence of an electrical signal. However, if a single electrical signal, for example a positive voltage relative to ground, is applied to both the first connecting means and the second connecting means, the array will electrically float at the applied potential but will not expand. According to the invention, in order to produce expansion, at least two interleaved arrays, such as the arrays of FIG. 1 or 3 are used, as will now be described.

In particular, referring to FIG. 8, a plurality of interleaved arrays, 10a–10d, each of which comprises a plurality of electrically conductive walls 14a, 14b arranged in closely spaced relation, is provided. In FIG. 8, the arrays of FIG. 4A are used. However, it will be understood by those having skill in the art that other arrays having a plurality of electrically conductive walls, arranged in closely spaced relation, may be used. For example, the arrays of the aforesaid application Ser. No. 07/619,183, now U.S. Pat. No. 5,206,557 may be used. An insulating sheet 30a–30c is located between adjacent interleaved arrays 10a–10d to electrically insulate the conductors on adjacent arrays from one another. As shown in FIG. 8, the insulating sheets 30a–30c may be pleated sheets of polyimide, unmetallized versions of the arrays of the aforesaid application Ser. No. 07/619,183, or other insulators. Alternatively, one or more faces of the arrays 10a–10d may be coated with an insulating layer to form the insulating sheet.

Figure 9A:
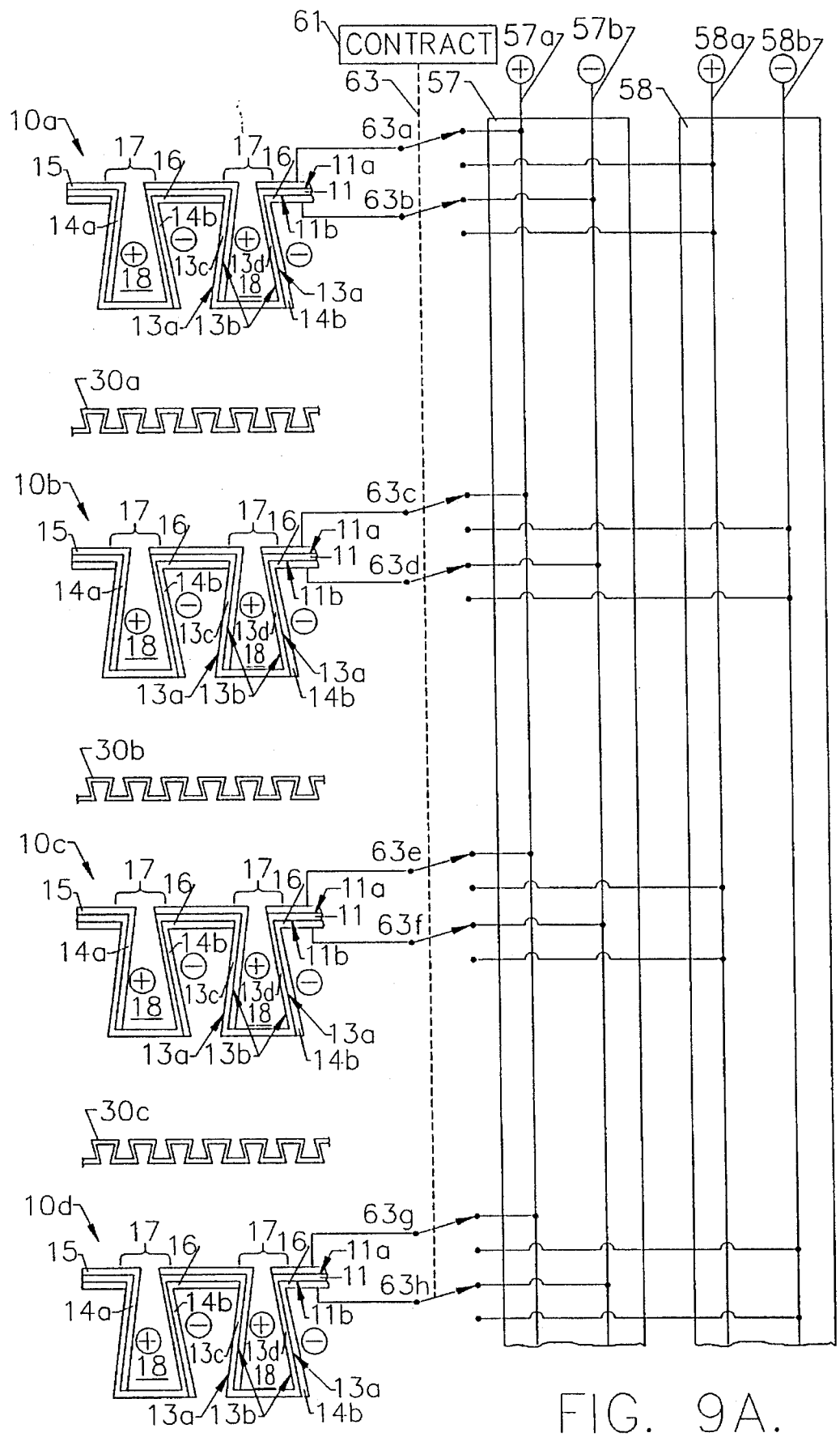
FIGS. 9A and 9B illustrate the transducer of FIG. 8 in a contracted and expanded state, respectively.

Still referring to FIG. 8, contracting means 57 is provided for applying an electrical signal between alternating electrically conductive walls in each of the interleaved arrays. In particular, conductor 57a is electrically connected to first connecting means 15 of each of the interleaved arrays, while conductor 57b is electrically connected to the second connecting means 16 of each of the interleaved arrays. The connection may be made through a multisection switch 63. Accordingly, as shown in FIG. 9A, when a "contract" signal 61 is applied by placing switch 63 in its upper control position, adjacent walls of each array become oppositely charged and move towards one another by electrostatic attraction. The voltages on each wall are indicated by circled "+" and "−" signs for ease of illustration. It will be understood by those having skill in the art that the plus and minus signs are relative, and merely indicate a voltage differential. Accordingly, one of the plus or minus terminals may be grounded with the other terminal being at a higher or lower voltage. The plurality of interleaved arrays thereby contract in the horizontal direction along the length of each array. Accordingly, each array 10a–10b operates as already described in connection with FIG. 4B.

Figure 9B:
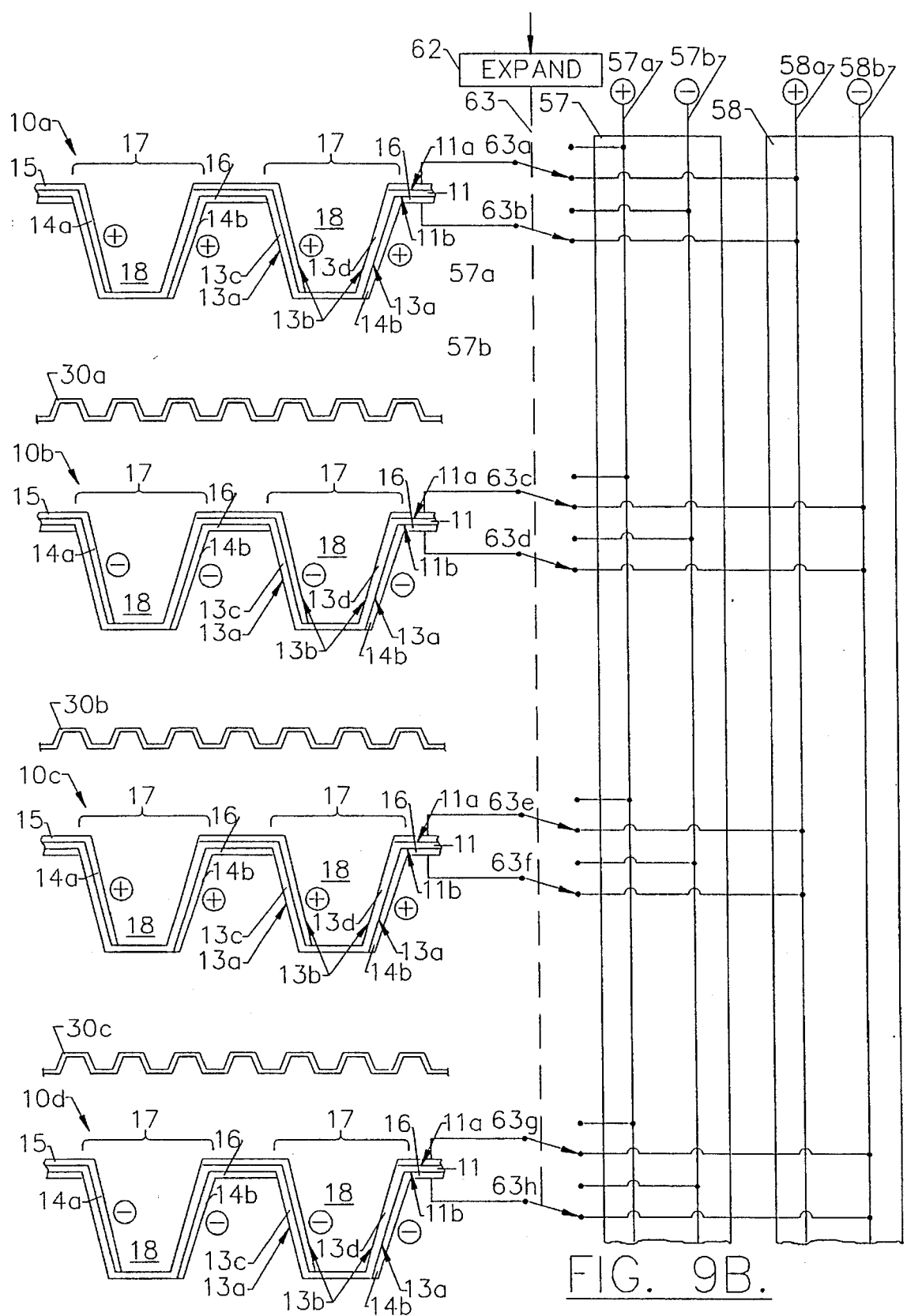

As also shown in FIG. 8, an expanding means 58 is included for applying an electrical signal between all of the electrically conductive walls in alternating ones of the interleaved array, so that adjacent walls on each array move away from one another by electrostatic repulsion, and the arrays expand. In particular, conductor 58a is electrically connected to the first connecting means 15 and second connecting means 16 in first alternating ones of the arrays, here arrays 10a and 10c. Conductor 58b is connected to the first connecting means 15 and second connecting means 16 of second alternating ones of the arrays, here arrays 10b and 10d. Again, the connection may be made through switch 63. Accordingly, as shown in FIG. 9B, when an "expand" signal 62 is applied by placing switch 63 in its lower control position, adjacent walls in each array move away from one another by electrostatic repulsion and the plurality of interleaved arrays expands. The voltages on each wall are indicated by circled "+" and "−" signs for ease of illustration.

Figure 10:
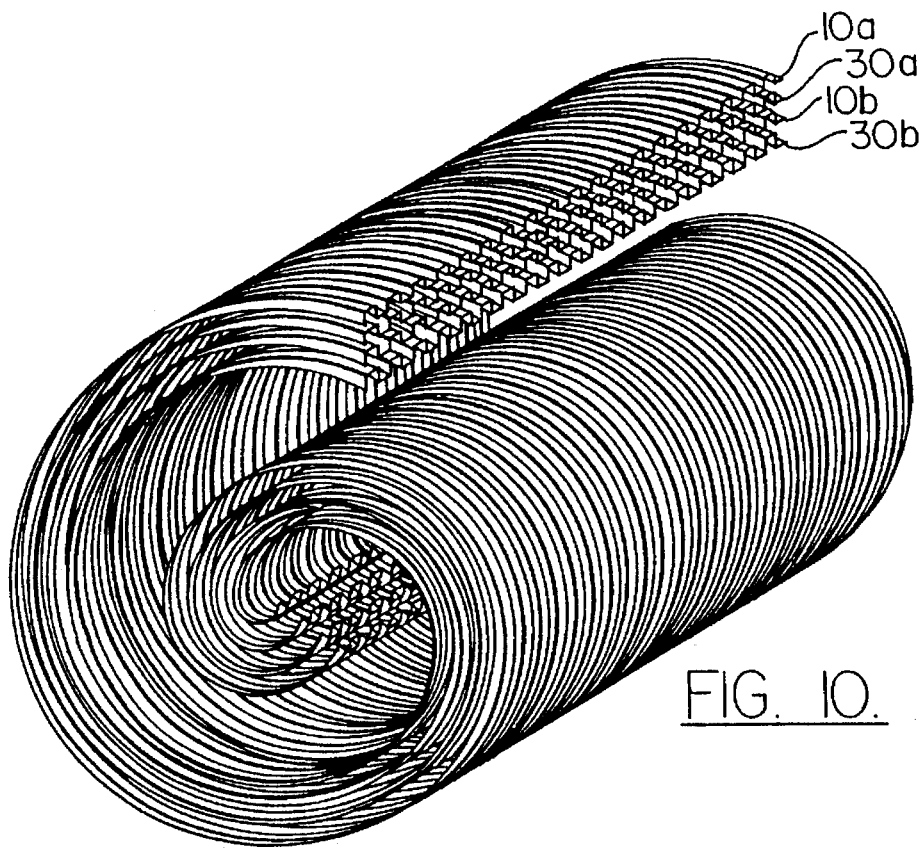
FIG. 10 schematically illustrates a perspective view of the transducer of FIG. 8 in a spiral configuration for linear expansion and contraction, along the direction of the spiral axis.

The interleaved arrays illustrated in FIGS. 8 and 9A–9B may be a plurality of planar arrays which are stacked upon each other, so that contraction and expansion occur in a linear direction, i.e. the horizontal direction as shown in these figures. However, it will be understood by those having skill in the art that the plurality of interleaved arrays may also comprise a plurality of interwound spiral arrays which contract and expand in a similar linear direction. Such an array is illustrated schematically in FIG. 10 in which spiral arrays 10a–10b are separated by spiral insulating sheets 30a–30b. The arrays may be connected to expanding and contracting means as shown in FIGS. 8 and 9A–9B. One advantage of the spiral arrays is that only two planar arrays (10a, 10b) and two insulating sheets (30a, 30b) need be fabricated to provide the same effect as many stacked planar sheets. In the case of this example, the number of interleaved arrays is effectively four times the number of spiral turns. It will also be understood that more than two planar arrays and insulating sheets may be used.

Figure 11:
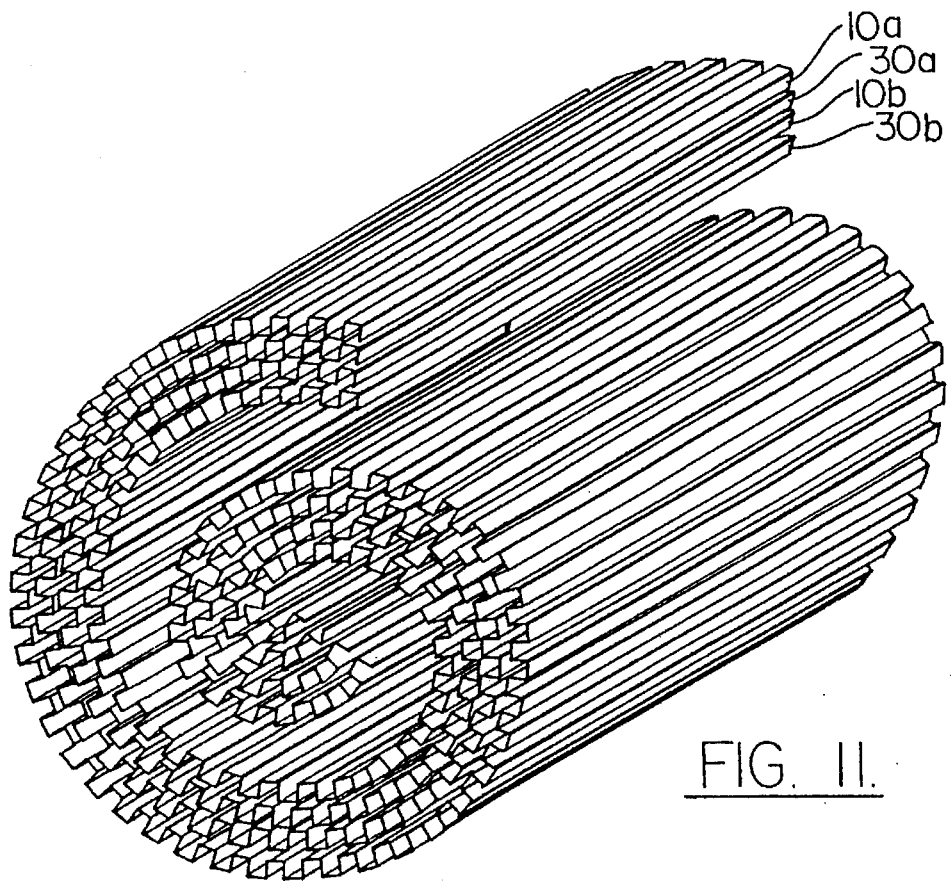
FIG. 11 schematically illustrates a perspective view of the transducer of FIG. 8 in a spiral configuration for circular expansion and contraction about the spiral axis.

A second embodiment of an interwound spiral array is illustrated in FIG. 11. As shown, the direction of the expansion and contraction is oriented at 90° relative to the spiral array of FIG. 10. Thus, the plurality of insulated spiral arrays contract and expand in a circular direction so that the overall forces act in the radial direction. Such an array may be useful in applications which require a gripping or holding. As shown in FIG. 11, spiral arrays 10*a*, 10*b* are separated by spiral insulating sheets 30*a*–30*b* and are connected as described above.

It will also be understood by those having skill in the art that the interleaved array of FIG. 9B produces attractive forces between adjacent arrays so that the stacked arrays tend to hold themselves together when powered. In other cases, such as the configuration of FIG. 9A, additional mechanical connection between adjacent interleaved arrays and/or insulating sheets may be provided by pins, solder pads or other attachment means which mechanically connect adjacent arrays. Mechanical connection is also provided by the inherent nature of the spirally wound arrays of FIG. 10.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A microelectromechanical transducer comprising:

a sheet having first and second opposing faces and including a plurality of spaced apart pleats therein, said pleats defining a plurality of spaced apart walls, each of said walls including first and second opposing sides formed of said first and second opposing faces respectively;

each of said walls further including an electrically conductive portion, with the electrically conductive portion of adjacent walls being located at opposite ones of said first and said second opposing sides, such that a wall and a space are between adjacent electrically conductive portions, the electrically conductive portions on said first sides defining a first conductor group and the electrically conductive portions on said second sides defining a second conductor group;

first means for electrically connecting said first conductor group; and second means for electrically connecting said second conductor group, such that an electrical signal which is applied between said first and said second means causes adjacent walls to move towards one another in the space therebetween, by electrostatic attraction, and the wall between said adjacent electrically conductive portions prevents said first and second conductor groups from contacting one another.

2. The transducer of claim 1 wherein said first means comprises a first conductor line on said first face, electrically connected to said first conductor group, and wherein said second means comprises a second conductor line on said second face, electrically connected to said second conductor group.

3. The transducer of claim 2 wherein said first conductor line and said first conductor group are formed in a patterned conductor layer on said first face, and wherein said second conductor line and said second conductor group are formed in a patterned conductor layer on said second face.

4. The transducer of claim 1 wherein said sheet includes a peripheral portion extending beyond said pleats, and wherein said first means comprises a first conductor on the first face of said sheet, at said peripheral portion, electrically connected to said first conductor group, and wherein said second means comprises a second conductor on the second face of said sheet, at said peripheral portion, electrically connected to said second conductor group.

5. The transducer of claim 1 wherein said sheet is a solid, flexible dielectric sheet.

6. The transducer of claim 1 wherein said sheet is parylene.

7. The transducer of claim 1 further including at least one anchor extending across each of said pleats.

8. The transducer of claim 1 further including a strengthening bar extending along at least one of said pleats.

9. A microelectromechanical transducer comprising:

a sheet which is formed into an array of trenches, each of said trenches having a first and a second trench wall and a space therebetween, said first and second trench walls having inner sides which face one another and outer sides which oppose one another;

each trench having a first conductive portion on said first trench wall and a second conductive portion on said second trench wall, the first conductive portion being on said inner side of said first trench wall, and the second conductive portion being on the outer side of said second trench wall, such that said second trench wall and said space are between adjacent ones of said first and second conductive portions;

first means for electrically connecting said first conductive portions; and second means for electrically connecting said second conductive portions, such that an electrical signal which is applied between said first and said second means causes the first and second trench walls of each trench to move towards one another in the space therebetween by electrostatic attraction, and the trench wall between adjacent conductive portions prevents adjacent conductive portions from contacting one another.

10. The transducer of claim 9 wherein said first means comprises a first conductor line on said inner sides, electrically connected to each of said first conductive portions, and wherein said second means comprises a second conductor line on said outer sides, electrically connected to each of said second conductive portions.

11. The transducer of claim 10 wherein said first conductor line and said first conductive portions are formed in a patterned conductor layer on said inner sides, and wherein, said second conductor line and said second conductive portions are formed in a patterned conductor layer on said outer sides.

12. The transducer of claim 9 wherein said sheet includes a peripheral portion extending beyond said pleats, and wherein said first means comprises a first conductor on a first face of said sheet, at said peripheral portion, electrically connected to said first conductive portions, and wherein said second means comprises a second conductor on a second face of said sheet, at said peripheral portion, electrically connected to said second conductive portions.

13. The transducer of claim 9 wherein said sheet is a solid, flexible dielectric sheet.

14. The transducer of claim 9 wherein said sheet is parylene.

15. The transducer of claim 9 further including at least one anchor extending across each of said trenches.

16. The transducer of claim 9 further including a strengthening bar extending along at least one of said trenches.

17. The transducer of claim 9 wherein each trench further includes an end portion at each end thereof, between said first and second trench walls.

18. A microelectromechanical transducer comprising:

a sheet having a plurality of spaced apart pleats therein, said pleats defining a plurality of spaced apart walls, each of said walls including a conductive layer thereon, wherein all of the conductive layers are oriented in a same predetermined direction relative to the wall on which it is located;

first means for electrically connecting first alternating ones of said conductive layers; and second means for electrically connecting second alternating ones of said conductive layers, such that an electrical signal applied between said first and second means causes adjacent walls to move towards one another by electrostatic attraction, and the wall between adjacent conductive layers prevents adjacent conductors from contacting one another.

19. The transducer of claim 18 wherein said first means comprises a first conductor line on a first face of said sheet, electrically connected to said first alternating conductive layers, and wherein said second means comprises a second conductor line on a second face of said sheet, electrically connected to said second alternating conductive layers.

20. The transducer of claim 19 wherein said first conductor line and said first alternating conductive layers are formed in a patterned conductor layer on a first face of said sheet, and wherein said second conductor line and said second alternating conductive layers are formed in a patterned conductor layer on a second face of said sheet.

21. The transducer of claim 18 wherein said sheet includes a peripheral portion extending beyond said pleats, and wherein said first means comprises a first conductor on a first face of said sheet, at said peripheral portion, electrically connected to said first alternating conductive layers, and wherein said second means comprises a second conductor on a second face of said sheet, at said peripheral portion, electrically connected to said second alternating conductive layers.

22. The transducer of claim 18 wherein said sheet is a solid, flexible dielectric sheet.

23. The transducer of claim 18 wherein said sheet is parylene.

24. The transducer of claim 18 further including at least one anchor extending across each of said pleats.

25. The transducer of claim 18 further including a strengthening bar extending along at least one of said pleats.

26. A microelectromechanical transducer comprising:

a sheet having first and second opposing faces and including a plurality of spaced apart pleats therein, said pleats defining a plurality of walls;

a first conductive layer at said first face; and a second conductive layer at said second face;

said first and second conductive layers being arranged at said first and said second opposing faces, respectively, such that an electrical signal which is applied between said first and second conductive layers causes adjacent walls to move towards one another by electrostatic attraction.

27. The transducer of claim 26 wherein said sheet is a solid, flexible dielectric sheet.

28. The transducer of claim 26 wherein said sheet is parylene.

* * * * *